(12) United States Patent
Bao et al.

(10) Patent No.: US 11,763,487 B2
(45) Date of Patent: *Sep. 19, 2023

(54) METHOD FOR AUGMENTED REALITY DISPLAY, METHOD FOR DETERMINING POSE INFORMATION, AND APPARATUSES

(71) Applicant: TENCENT TECHNOLOGY (SHENZHEN) COMPANY LIMITED, Shenzhen (CN)

(72) Inventors: Linchao Bao, Shenzhen (CN); Wei Liu, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 48 days.

This patent is subject to a terminal disclaimer.

(21) Appl. No.: 17/540,131

(22) Filed: Dec. 1, 2021

(65) Prior Publication Data

US 2022/0092817 A1    Mar. 24, 2022

Related U.S. Application Data

(63) Continuation of application No. 16/778,259, filed on Jan. 31, 2020, now Pat. No. 11,222,442, which is a (Continued)

(30) Foreign Application Priority Data

Jul. 31, 2017    (CN) .......................... 201710643376.8

(51) Int. Cl.
  *G06T 7/73*    (2017.01)
  *G06T 7/246*   (2017.01)
  *G06T 5/50*    (2006.01)

(52) U.S. Cl.
  CPC .................. *G06T 7/74* (2017.01); *G06T 5/50* (2013.01); *G06T 7/248* (2017.01); *G06T 2207/30244* (2013.01)

(58) Field of Classification Search
  CPC ........... G06T 7/20; G06T 7/246; G06T 7/248; G06T 7/30; G06T 7/33; G06T 7/337;
  (Continued)

(56) References Cited

U.S. PATENT DOCUMENTS 9,466,143 B1    10/2016    Walvoord et al.
11,222,442 B2*   1/2022    Bao et al. ................. G06T 5/50
(Continued)

FOREIGN PATENT DOCUMENTS

CN    101826206 A    9/2010
CN    104933755 A    9/2015
(Continued)

OTHER PUBLICATIONS

Wang et al., "The Use of Object Tracking in Visual SLAM," Proc. 2017 IEEE Int'l Conf. on Applied System Innovation, pp. 850-853. (Year: 2017).
(Continued)

*Primary Examiner* — Andrew W Johns
(74) *Attorney, Agent, or Firm* — Anova Law Group, PLLC

(57)    ABSTRACT

A method for an image capturing device includes: acquiring a first image of a target object; extracting coordinate information of a first 2D key point corresponding to the target object; acquiring a second image of the target object; acquiring coordinate information of a second 2D key point in the second image according to the coordinate information of the first 2D key point, the first 2D key point and the second 2D key point being the same key point in the target object; acquiring coordinate information of a 3D key point corre-
(Continued)

sponding to the target object, the 3D key point being a key point obtained after a triangulation operation; and determining camera posture information of the second image according to the coordinate information of the first 2D key point, the coordinate information of the second 2D key point, the coordinate information of the 3D key point, and a 3D-2D projection.

20 Claims, 7 Drawing Sheets

Related U.S. Application Data continuation of application No. PCT/CN2018/097494, filed on Jul. 27, 2018.

(58) Field of Classification Search
CPC .. G06T 7/38; G06T 7/55; G06T 7/579; G06T 7/70; G06T 7/73; G06T 7/74; G06T 7/97; G06T 2207/30244; G06V 2201/12; G01C 11/06; G01C 11/08; G01C 11/30
See application file for complete search history.

(56) References Cited

U.S. PATENT DOCUMENTS

| | | | |
|---|---|---|---|
| 2004/0167667 | A1 | 8/2004 | Goncalves et al. |
| 2010/0232727 | A1 | 9/2010 | Engedal |
| 2014/0078258 | A1 | 3/2014 | Chandraker et al. |
| 2014/0376821 | A1 | 12/2014 | Meir et al. |
| 2015/0098645 | A1 | 4/2015 | Leung |
| 2016/0196692 | A1* | 7/2016 | Kjallstrom et al. .. G06T 19/006 345/633 |
| 2016/0350904 | A1 | 12/2016 | Zhang et al. |
| 2017/0098312 | A1 | 4/2017 | Souchard |
| 2017/0186177 | A1 | 6/2017 | Nagori et al. |

FOREIGN PATENT DOCUMENTS

| | | |
|---|---|---|
| CN | 106778890 A | 5/2017 |
| EP | 3001384 A1 | 3/2016 |
| JP | 2008304269 A | 12/2008 |
| JP | 2011047739 A | 3/2011 |
| JP | 2017130042 A | 7/2017 |

OTHER PUBLICATIONS

Younes et al., "Keyframe-based moncular SLAM: design, survey, and future directions," Robotics and Autonomous Systems 98 (2017) 67-88. (Year: 2017).

The World Intellectual Property Organization (WIPO) International Search Report for PCT/CN2018/097494 dated Oct. 24, 2018 6 pages (including translation).

Georg Klein et al, "Parallel Tracking and Mapping for Small AR Workspaces," ISMAR 2007. 10 pages.

Raul Mur-Artal et al., "ORB-SLAM: A Versatile and Accurate Monocular SLAM System," IEEE Transactions on Robotics 2015. 17 pages.

Christian Forster et al. "SVO: Fast Semi-Direct Monocular Visual Odometry," ICRA 2014. 8 pages.

Jakob Engel et al, "LSD-SLAM: Large-Scale Direct Monocular SLAM"; ECCV 2014. 31 pages.

Edward Rosten et al., "Machine learning for high-speed corner detection", ECCV 2006. 14 pages.

Harris, Chris et al., "A combined corner and edge detector", Alvey vision conference. vol. 15. No. 50.1988. 6 pages.

Bruce D. Lucas et al, "An iterative image registration technique with an application to stereo Vision," Proc 7the Intl Joint Conf on Artificial Intelligence (IJCAI), Aug. 24-28, 1981 , Vancuver, British Columbia, pp. 674-679. 6 pages.

Etienne Vincent et al., "Detecting planar homographies in an image pair", Image and Signal Processing and Analysis, 2001, Proceedings of the 2nd International Symposium on IEEE, 2001. 6 pages.

Richard I. Hartley et al., "Triangulation", Computer vision and image understanding vol. 68, No. 2, Nov. 1997, pp. 146-157. 12 pages.

Raner Kummerle et al., "g2o: A general framework for graph optimization", In Robotics and Automation (ICRA), 2011 IEEE International Conference (pp. 3607-3613). IEEE, May 9-13, 2011, Shanghai, China 7 pages.

The Japan Patent Office (JPO) Notification of Reasons for Refusal for Application No. 2020-503262 and Translation dated May 18, 2021 8 pages.

Ueda et al., "Efficient self-position estimation and map generation algorithms suitable for personal digital assistants," IEICE Technical Report vol. 112, No. 198, Japan, General Incorporated Foundation Institute of Electronics, Information and Communication Engineers, 2012, vol. 112. 9 pages.

\* cited by examiner

METHOD FOR AUGMENTED REALITY DISPLAY, METHOD FOR DETERMINING POSE INFORMATION, AND APPARATUSES

RELATED APPLICATIONS

This application is a continuation application of U.S. patent application Ser. No. 16/778,259, filed on Jan. 31, 2020. U.S. patent application Ser. No. 16/778,259 is a continuation application of PCT Patent Application No. PCT/CN2018/097494, filed on Jul. 27, 2018, which claims priority to Chinese Patent Application No. 201710643376.8, entitled "METHOD FOR AUGMENTED REALITY DISPLAY, METHOD FOR DETERMINING POSE INFORMATION, AND APPARATUSES" filed with the Chinese Patent Office on Jul. 31, 2017, content of all of which is incorporated by reference in its entirety.

FIELD OF THE TECHNOLOGY

Embodiments of the present disclosure relate to the field of simultaneous localization and mapping (SLAM) and, in particular, to a method for determining information of an image capturing device and related apparatuses.

BACKGROUND

In the field of SLAM, when entering a strange environment, a device (for example, a robot or a virtual reality (VR) device) needs to precisely establish a correspondence between time and space.

At present, in a SLAM system, during the tracking of a camera, calculated three-dimensional (3D) points are usually projected on a new frame of two-dimensional (2D) image, and camera posture information of the camera is estimated. To be specific, a manner of 3D-2D correspondences is used to perform tracking.

FIG. 1 is a schematic diagram of acquiring 3D points based on 3D-2D correspondences in the related art. Referring to FIG. 1, during the estimation of camera posture information of a $t^{th}$ frame of image, a $(t-1)^{th}$ frame of image and a $(t-2)^{th}$ frame of image need to be used to perform triangulation on key points, 3D positions (hollow stars in FIG. 1) of the key points are obtained, and the 3D positions of the key points are then used to estimate the camera posture information of the $t^{th}$ frame of image. In the case of fast movement from the $(t-2)^{th}$ frame of image to the $t^{th}$ frame of image, hollow stars only account for a small part of the $t^{th}$ frame of image. When key points in such a small part are used to estimate the camera posture information of the entire $t^{th}$ frame of image, a relatively large error may occur. In addition, a tracking loss tends to occur because of an excessively small quantity of key points in tracking.

The disclosed methods and systems are directed to solve one or more problems set forth above and other problems.

SUMMARY

Embodiments of the present disclosure provide a method for augmented reality (AR) display, a method for determining posture information, and apparatuses, to obtain more key points during the estimation of camera posture information, so as to reduce errors in camera posture information, and to avoid tracking loss.

According to one aspect of the present disclosure, a method for AR display is provided for an image capturing device. The method includes acquiring a first image of a target object; extracting coordinate information of a first two-dimensional (2D) key point corresponding to the target object from the first image; acquiring a second image of the target object; and acquiring coordinate information of a second 2D key point in the second image according to the coordinate information of the first 2D key point. The first 2D key point and the second 2D key point are the same key point in the target object. The method also includes acquiring coordinate information of a three-dimensional (3D) key point corresponding to the target object, the 3D key point being a key point obtained after a triangulation operation; and determining camera posture information of the second image according to the coordinate information of the first 2D key point, the coordinate information of the second 2D key point, the coordinate information of the 3D key point and a 3D-2D projection, the camera posture information being used for determining a position of the target object in the second image.

According to another aspect of the present disclosure, an image capturing device is provided. The image capturing device includes a memory being configured to store a computer program; a bus system; and a processor connected to the memory via the bus system. The processor is configured to execute the computer program in the memory to perform: acquiring a first image of a target object; extracting coordinate information of a first two-dimensional (2D) key point corresponding to the target object from the first image; acquiring a second image of the target object; acquiring coordinate information of a second 2D key point in the second image according to the coordinate information of the first 2D key point, the first 2D key point and the second 2D key point being the same key point in the target object; acquiring coordinate information of a three-dimensional (3D) key point corresponding to the target object, the 3D key point being a key point obtained after a triangulation operation; and determining camera posture information of the second image according to the coordinate information of the first 2D key point, the coordinate information of the second 2D key point, the coordinate information of the 3D key point, and a 3D-2D projection, the camera posture information being used for determining a position of the target object in the second image.

According to one aspect of the present disclosure, a non-transitory computer-readable storage medium is provided. The non-transitory computer-readable storage medium stores computer program instructions executable by at least one processor to perform: acquiring a first image of a target object; extracting coordinate information of a first two-dimensional (2D) key point corresponding to the target object from the first image; acquiring a second image of the target object; acquiring coordinate information of a second 2D key point in the second image according to the coordinate information of the first 2D key point, the first 2D key point and the second 2D key point being the same key point in the target object; acquiring coordinate information of a three-dimensional (3D) key point corresponding to the target object, the 3D key point being a key point obtained after a triangulation operation; and determining camera posture information of the second image according to the coordinate information of the first 2D key point, the coordinate information of the second 2D key point, the coordinate information of the 3D key point, and a 3D-2D projection, the camera posture information being used for determining a position of the target object in the second image.

Other aspects of the present disclosure can be understood by those skilled in the art in light of the description, the claims, and the drawings of the present disclosure.

DETAILED DESCRIPTION

Embodiments of the present disclosure provide a method for AR display, a method for determining posture information, and apparatuses, to obtain more key points during the estimation of camera posture information of a second image, so that errors in camera posture information are reduced, and a tracking loss because of an excessively small quantity of key points in tracking can be avoided.

In the specification, claims, and accompanying drawings of the present disclosure, the terms "first", "second", "third", "fourth", and the like (if existing) are intended to distinguish between similar objects rather than describe a specific sequence or a precedence order. It is to be understood that data used in this way is interchangeable in a suitable case, so that the embodiments of the present disclosure described herein can be implemented in a sequence in addition to the sequence shown or described herein. Moreover, the terms "include", "contain" and any other variants mean to cover the non-exclusive inclusion. For example, a process, method, system, product or device that includes a list of steps or units is not necessarily limited to those steps or units clearly listed, but may include other steps or units not expressly listed or inherent to such a process, method, product or device.

It is to be understood that this solution is mainly applied to a SLAM system, and is used for a device to locate itself based on location estimation and a map during movement and also build an incremental map based on its positioning, thereby implementing autonomous positioning and navigation of the device. This solution may be specifically applied to VR products, AR products, and Visual Robot Navigation (VRN) products, and the like. Specific products are not limited herein.

VR essentially provides immersive experiences to enable a user to experience a completely different virtual world. SLAM is the perception and comprehension of the real world. If a VR product requires SLAM, the virtual world and the real world can be combined. In commercially available VR products, a six-axis gyroscope is used to track the rotation of the head of a user but cannot track the displacement of the user. However, SLAM can resolve the tracking in six degrees of freedom.

AR is essentially perfect integration of virtual elements in reality. Compared with VR products, AR products have much more complex algorithms, software, and hardware, and the mass production of AR products are much more difficult. It is imperative that AR is provided with a SLAM system.

Figure 1:
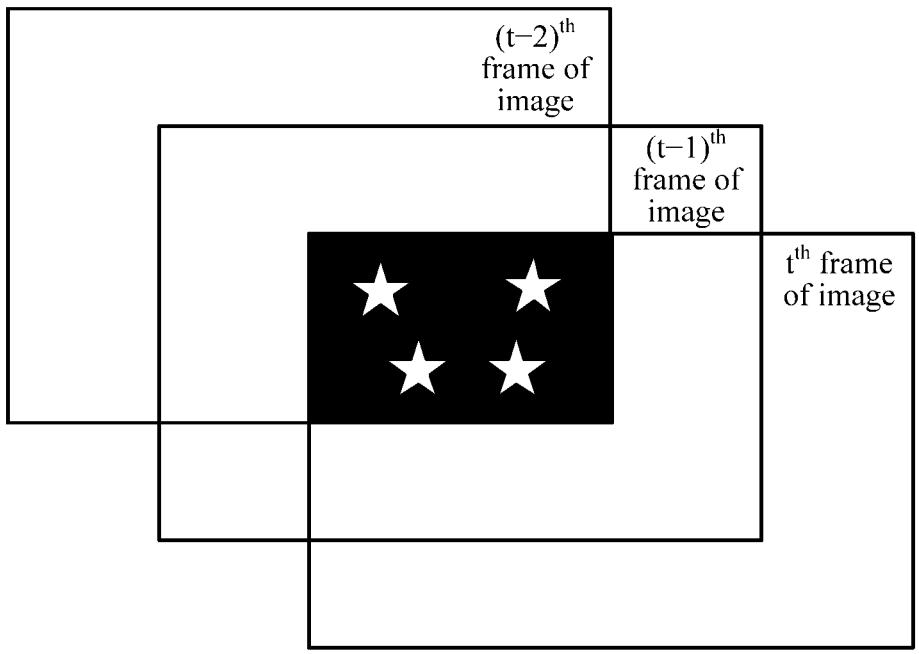
FIG. 1 is a schematic diagram of acquiring 3D points based on 3D-2D correspondences.
Figure 2:
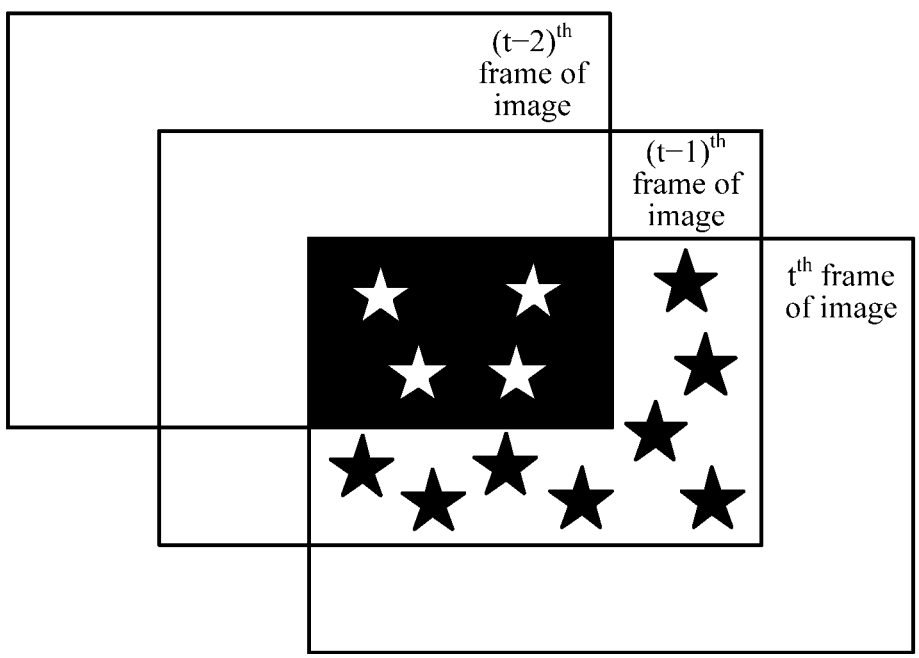
FIG. 2 is a schematic diagram of acquiring 3D points based on 3D-2D correspondences according to an embodiment of the present disclosure.

The embodiments of the present disclosure provide a camera tracking method combining 3D-2D correspondences and 2D-2D correspondences, in which more stable 2D-2D correspondences are used to assist in tracking with 3D-2D correspondences, thereby improving the tracking stability of the SLAM system. FIG. 2 is a schematic diagram of acquiring 3D points based on 3D-2D correspondences according to an embodiment of the present disclosure. Referring to FIG. 2, during the estimation of camera posture information of a $t^{th}$ frame of image, a $(t-1)^{th}$ frame of image and a $(t-2)^{th}$ frame of image need to be used to perform triangulation on key points, 3D positions (hollow stars in FIG. 2) of the key points are obtained, the $t^{th}$ frame of image and the $(t-1)^{th}$ frame of image also need to be used to obtain 2D positions (solid stars in FIG. 2) of the key points, and the 2D positions and the 3D positions of the key points are then used to estimate the camera posture information of the $t^{th}$ frame of image.

Figure 3:
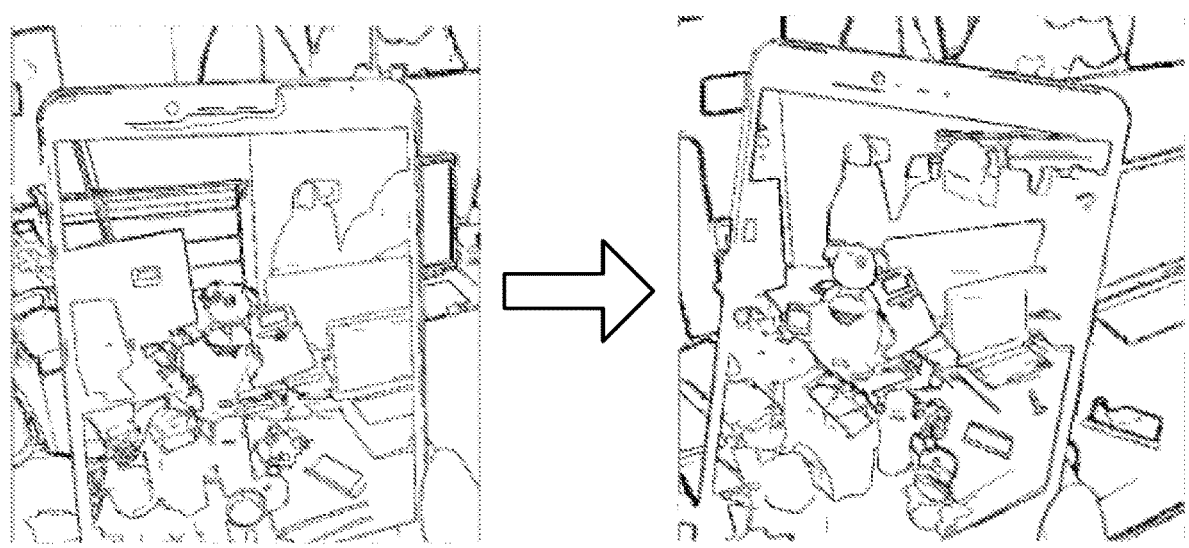
FIG. 3 is a schematic diagram of an interface that presents a target object according to camera posture information according to an embodiment of the present disclosure.

For ease of understanding, target objects presented in the embodiments of the present disclosure may be described below by using a specific application scenario. FIG. 3 is a schematic diagram of an interface that presents a target object according to camera posture information according to an embodiment of the present disclosure. Referring to FIG. 3, the image on the left is the picture before movement, and the image on the right is the picture after movement. A user may see on the screen of a mobile phone a virtual object (for example, the pig in FIG. 3) moving at a fixed position (for example, on a table) in a real 3D scene, and the virtual object does not move as the user's mobile phone moves.

The embodiments of the present disclosure may be applied to an AR system. A method for AR display provided in the embodiments of the present disclosure is described below. The method for AR display includes the followings.

First, an image capturing device acquires a target object from different photographing angles in the same real scene. The target object may be a book, a tree, a television set or a can of cola, etc. It is intended to integrate a virtual object with the target object. The virtual object may be a cartoon character designed beforehand by a designer or a doodle, without limitation.

After the target object is determined, the image capturing device extracts coordinate information of a first 2D key point corresponding to the target object from a first image. Next, the image capturing device continues to acquire a second image. It may be understood that the second image and the first image come from the same target object. The image capturing device may acquire coordinate information of a second 2D key point in the second image according to the coordinate information of the first 2D key point. The first 2D key point and the second 2D key point are the same key point in the target object.

The image capturing device needs to acquire a 3D key point, and may determine coordinate information of the 3D key point. The coordinate information of the 3D key point mainly includes coordinate information in six dimensions, that is, displacements in three directions and at three angles. The 3D key point is a key point on which triangulation processing has been successfully performed in previous frames of image. The image capturing device determines camera posture information of the second image according to the coordinate information of the first 2D key point, the coordinate information of the second 2D key point, and the coordinate information of the 3D key point. The camera posture information is used for determining a position of the target object in the second image. The camera posture information may represent photographing space information of the second image.

The image capturing device acquires additional image information. The additional image information is an image in a photographed real scene, for example, a swimming pool, a garden or a high school playground. Finally, the image capturing device combines the second image, the camera posture information of the second image, and the additional image information into an augmented image. For example, the additional image information is an image of a high school playground. The second image includes a tree. It is determined according to the camera posture information of the second image that there is an animated bird in the tree. In this case, the augmented image shows the foregoing content. The augmented image is used for displaying AR content.

Several application scenarios in which the method for AR display provided in the embodiments of the present disclosure is applied are described below.

1. AR Map

The method for AR display may be used to present a navigation application in which a pedestrian can easily follow a route. In the application, an arrow and a route are directly added to a real environment, to provide a highly intuitive navigation route. In addition, the method for AR display may also be used to recognize local landmarks and provide useful information about such buildings, for example, names of places and distances between buildings. This is not limited.

The image capturing device can recognize places or objects according to scene-sensitive information software, and joins digital information and real-world scenes. The scene-sensitive information software includes an application that can readily acquire existing static data on the Internet according to a specific scene. Such software may be run on a smart terminal. A user may use the viewing angle of a camera on the smart terminal to see surrounding digital information. Such digital information may be nearby places of interest, for example, a museum, a store, a restaurant or a walking route to a next bus stop. The software implements image recognition by using the Global Positioning System (GPS), Wireless Fidelity (Wi-Fi), and 3D modeling, to implement a user positioning function.

2. AR Language Translation

Language translation is one of the most promising fields in AR applications. The method for AR display provided in the embodiments of the present disclosure may be applied to a smart terminal. The smart terminal may be used to synchronously translate text into text in another language. After opening an application, a user only needs to point the image capturing device at text in a foreign language. The image capturing device translates the information into information in the user's native language. The translated text has the same font and is printed on the same wall just like the original text.

3. AR Measurement Tool

Smart terminals oftentimes can nearly replace personal computers (PCs), but still cannot replace some tools such as a ruler or a triangle required in life. However, with AR technology, smart terminals may also be used as measurement tools. For example, by means of the method for AR display provided in the embodiments of the present disclosure, a virtual ruler may be integrated with the reality. A smart terminal is already provided with functions of a camera, a processor, a motion sensor, and the like. These are hardware conditions for virtual measurement tools. In addition, AR display technology is used to display two floating points on an object to be measured in reality. Data can therefore be obtained.

A virtual magnetic measurement tool may be consistent with a tape measure in reality. A user only needs to hold the smart terminal, confirm a starting point of a virtual magnetic measurement ruler on the screen, move the smart terminal horizontally, and confirm the end point to obtain data immediately. Apart from a distance, AR display technology also makes it very easy to measure a space. For example, the user may hold the smart terminal and move the smart terminal along the edges of a room without needing to record the sizes of sides. After the smart terminal has been moved around a space to be measured, the system gives calculated data. The area of a space with any irregular shape can be easily calculated.

4. AR Furniture

By means of the AR display technology provided in the embodiments of the present disclosure, an application may further be designed. A consumer may tap and choose a digital furniture on a smart terminal and "place" it in the consumer's living room, so that it is more conveniently checked whether the size, style, and color of the furniture are suitable for a position. The application also allows a user to adjust the size and color of each part.

The effect of placing a furniture in a room is usually visualized before purchase. In the foregoing manner, it is only necessary to hold a smart terminal and point the camera at each corner of a room to pick a most suitable furniture. This also gives rise to a new sales approach in furniture retail. Sellers no longer need to bear the costs of large-area brick-and-mortar shops, and consumers can save the time and labor of browsing furniture shops.

Similarly, in some scenarios of fittings, according to the AR display technology provided in the embodiments of the present disclosure, a more user-friendly AR fitting experience can be provided. The size of a customer and the chosen clothes can be recognized. Therefore, it is no longer necessary for the customer to try on clothes with different colors. The customer only needs to put on a piece of clothing, stand in front of a mirror, and choose other colors according to prompts on a touchscreen, so that the image of the customer in the piece of clothing with a different color may be presented.

5. AR Teaching

When AR is used for dance teaching, the limitations in space and time can be removed for students and teachers. By means of the AR display technology described in the embodiments of the present disclosure, virtual "steps" may be cleverly applied to the reality. A student may learn dance steps by following virtual footprints. An application can even slow down according to a student's requirement, and enables a student to learn dancing with a dancing partner.

Similarly, apart from dance teaching, the AR display technology provided in the embodiments of the present disclosure may also be applied to martial art teaching, basketball teaching, swimming teaching, and the like. This is an example herein, and does not constitute a limitation to the embodiments of the present disclosure.

6. AR Logistics

Next, the logistics industry is used as an example to specifically describe the potential influence of the AR display technology. Although the application of AR in the logistics industry is still in a relatively early stage, AR can provide huge benefits. For example, AR enables a logistics provider to acquire information rapidly anytime anywhere. This is vital for precise planning and meticulous operation of tasks such as delivery and loading optimization, and also forms a solid basis for customer services with higher quality. Some instances are conceived for the application of AR in the logistics industry. These instances include the following four types, namely, warehouse operations, transportation optimization, last-kilometer distribution, and enhanced value-added services.

Warehouse operations are the most promising application field of AR in logistics. These operations take up approximately 20% of the total logistics cost. Picking tasks take up 55% to 65% of the total costs of warehouse operations. AR may start with improving a picking procedure, thereby greatly reducing the operation cost. AR also facilitates the training of new warehouse employees and temporary employees, and provides reference for warehouse planning. The picking procedure can be optimized by using visual picking.

In logistics, the most practical AR solution is a system that can optimize a picking procedure. Most of the warehouses in developed countries still use a paper-based picking approach. However, any paper-based approach is inefficient and error-prone. In addition, picking is usually performed by temporary workers. These people often require training at some costs to ensure efficient picking with as few mistakes as possible.

A visual picking system is currently in a final on-site test stage. The system includes a mobile AR apparatus such as a head mount display (HMD), a camera, a wearable PC, and a battery module that at least lasts one shift. The function of visual picking software in the system includes real-time object recognition, barcode reading, indoor navigation, and seamless information integration with a warehouse management system (WMS). The greatest benefit of visual picking is that a warehouse worker can obtain intuitive digital information support without using hands during manual picking. By means of such a system, warehouse workers can see digital picking lists in their views and can see the optimal route with the help of an indoor navigation function, thereby reducing the movement time through effective route planning. Image recognition software in the system can automatically read a barcode to determine whether a warehouse worker reaches a correct position, and directs the warehouse worker to rapidly locate an object to be picked from a shelf. Next, the warehouse worker can scan the object to synchronously register this procedure in the WMS to implement real-time stock update. In addition, systems of such types can reduce the time required for training new employees, and can remove language barriers that inadequately literate warehouse workers may encounter.

On-site tests of these AR systems have proven that such systems contribute greatly to improving the efficiency of warehouse operations. For example, a continuous picking verification function can reduce mistakes by 40%. It may be understood that the AR systems herein use the method for AR display provided in the embodiments of the present disclosure.

During warehouse planning, AR may be probably beneficial to a warehouse planning procedure. Warehouses nowadays are no longer only nodes for storage and distribution, and gradually provide more and more value-added services, including the assembly to labeling of products, repacking, and even product maintenance. This means that warehouses need to be redesigned to adapt the requirements of such new services. The AR technology may be used to intuitively see the effect of re-planning from a global perspective, so that interactive digital models to be changed are placed in an existing real warehouse environment. A manager may examine whether a planned change has an appropriate size, and establishes a model for a new work procedure. Benefiting from this, real warehouses in the future may be used as test sites for the planning of warehouse operations.

During transportation optimization, the application of high and new information technologies by logistics achieves much more timely, reliable, and safe cargo transportation. In the fields such as completeness check, international trade, driver navigation, and cargo loading, the AR display technology provided in the embodiments of the present disclosure has the potential of further optimizing cargo transportation, thereby achieving more efficient sorting. A picker wearing an AR device can know whether a load is complete with a quick scan. At present, the work requires manual statistics, or it takes a long time for a worker to scan barcodes one by one with a handheld device. A wearable AR device can use a combination of a scanner and a 3D depth-of-field sensor to determine a quantity of pallets or packages (by scanning a special label on each package) or determine the volume of a package (by using a measurement device). A measured value is compared with a predefined value, and a result is presented to a picker before the eyes. Such an AR system may also scan objects for damage or errors.

It may be understood that the foregoing six specific scenarios are not used to limit the embodiments of the present disclosure, but instead are used to help understand a provided executable environment. In operation, the method for AR display provided in the present disclosure may further be applied to gaming, medical training, and the like. For example, by means of the method for AR display, users can better immerse themselves in gaming environments, or interns can observe surgery closely without entering surgeries, so as to learn more practical knowledge. In addition, the method for AR display may also be used by real estate agents to show clients in air-conditioned offices pictures presented by using the method for AR display, instead of taking clients around to see houses in bad weather.

An AR-based interface is not limited to a computer device. The interface can also be used to control cars, entertainment devices, and household fittings such as a heating system.

Figure 4:
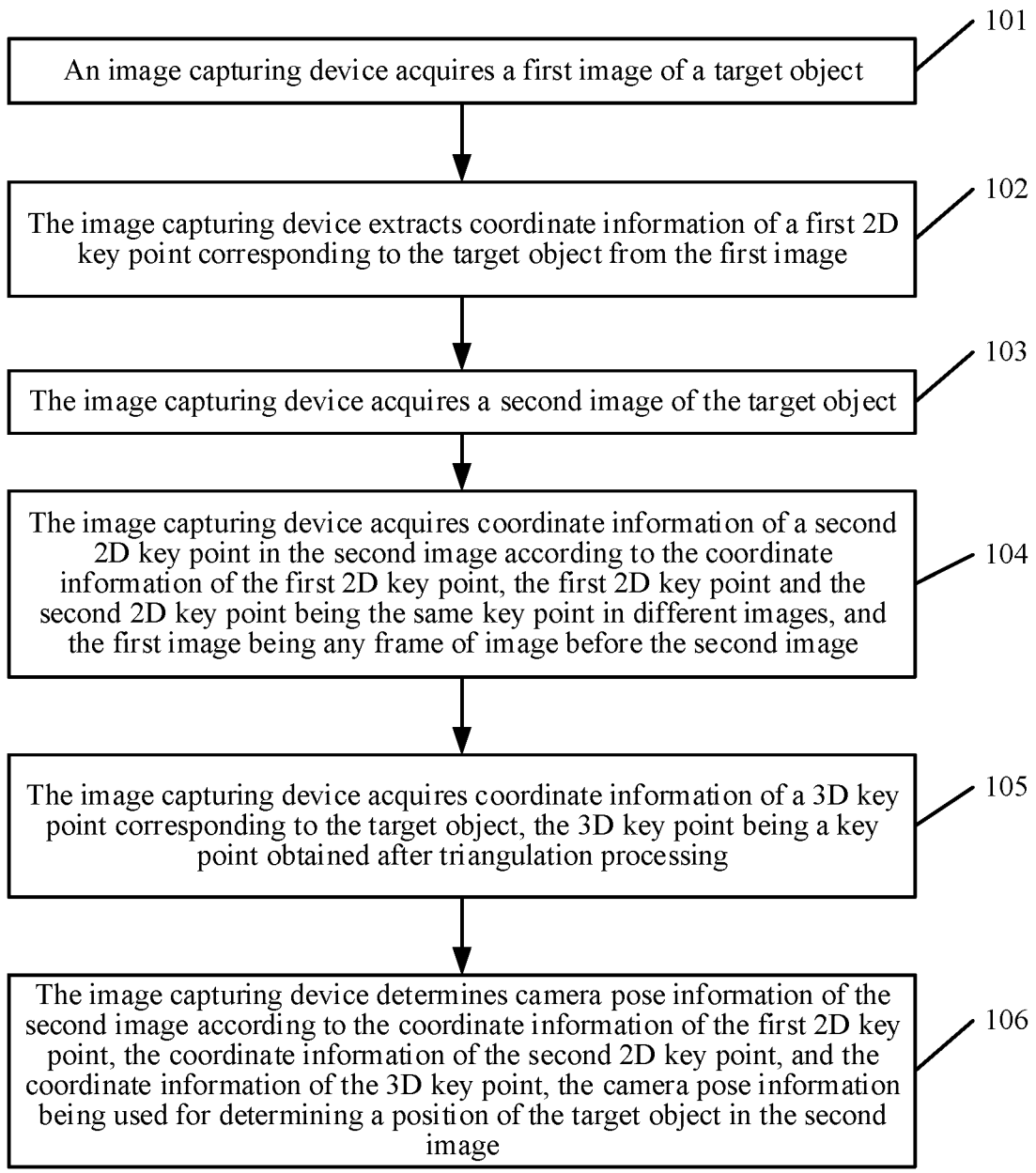
FIG. 4 is a schematic diagram of a method for determining information of an image capturing device according to an embodiment of the present disclosure.

The method for determining information of an image capturing device in the embodiments of the present disclosure is described below. Referring to FIG. 4, the method for determining information of an image capturing device in the embodiments of the present disclosure includes the followings.

101. An image capturing device acquires a first image of a target object.

In one embodiment, the image capturing device acquires a target object from different photographing angles in the same real scene. The target object may be a book, a tree, a television set or a can of cola. This is not limited herein. It is intended to integrate a virtual object with the target object. The virtual object may be a cartoon character designed beforehand by a designer or a doodle. This is not limited herein.

102. The image capturing device extracts coordinate information of a first 2D key point corresponding to the target object from the first image.

In one embodiment, the image capturing device first acquires a first 2D key point in the first image and corresponding coordinate information. A manner based on area division may be used to detect key points. Generally, one frame of image may be divided into 80×60 regular areas, and correspondence between key points and areas are established.

A features from accelerated segment test (FAST) manner or a Harris Corner Detection manner may be used to acquire a plurality of first 2D key points from the first image.

In operation, key points may be replaced with lines or edges. Points are used as an example for description in this solution. However, this does not constitute a limitation to the embodiments of the present disclosure.

103. The image capturing device acquires a second image of the target object.

In one embodiment, the image capturing device further acquires the second image. It may be understood that the second image and the first image come from the same target object. To be specific, the first image and the second image are two different pictures obtained by photographing a target object.

104. The image capturing device acquires coordinate information of a second 2D key point in the second image according to the coordinate information of the first 2D key point, the first 2D key point and the second 2D key point being the same key point in different images, and the first image being any frame of image before the second image.

In one embodiment, when a new frame of image is loaded, the image may be considered as the second image. In other words, the second image is a new frame of image that appears after the first image. After first 2D key points are obtained from the first image, a key point tracking algorithm (for example, a Lucas-Kanade pyramidal tracking algorithm) is used to calculate 2D positions of these first 2D key points in the current second image, so that the coordinate information of the second 2D key points is obtained.

It may be understood that the first 2D key point and the second 2D key point are physically the same key point. However, because the position changes, corresponding coordinate information also changes, and "first" and "second" are thus used to express the same key point.

Similarly, when a new image is loaded subsequently, the key point tracking algorithm still needs to be used to calculate a 2D position of a 2D key point in a previous frame of image in the new loaded image. In this way, the processing manner is similar for the $k^{th}$ image. Details are therefore not described herein.

105. The image capturing device acquires coordinate information of a 3D key point corresponding to the target object, the 3D key point being a key point obtained after triangulation processing.

In one embodiment, the image capturing device needs to acquire a 3D key point, and may determine coordinate information of the 3D key point. The coordinate information of the 3D key point mainly includes coordinate information in six dimensions, that is, displacements in three directions and three angles.

The 3D key point is a key point on which triangulation processing has been successfully performed in previous frames of image.

106. The image capturing device determines camera posture information of the second image according to the coordinate information of the first 2D key point, the coordinate information of the second 2D key point, and the coordinate information of the 3D key point, the camera posture information being used for determining a position of the target object in the second image.

In one embodiment, the image capturing device may acquire 2D-2D correspondences according to the coordinate information of the first 2D key point and the coordinate information of the second 2D key point, acquire 3D-2D correspondences according to the coordinate information of the 3D key point, and determine the camera posture information of the second image by using both the 2D-2D correspondences and the 3D-2D correspondences. The camera posture information is used for determining a position of the target object in the second image. The camera posture information may represent photographing space information of the second image. The target object is usually a photographed physical object. In addition, the camera posture information is also used to acquire a corresponding 3D key point and coordinate information of the 3D key point from an image loaded subsequently.

Thus, the embodiments of the present disclosure provide a method for determining information of an image capturing device. In the method, the image capturing device first acquires coordinate information of a first 2D key point in a first image, the image capturing device then acquires coordinate information of a second 2D key point in a second image according to the coordinate information of the first 2D key point, the first 2D key point and the second 2D key point being the same key point in different images, and the first image being any frame of image before the second image, the image capturing device then acquires coordinate information of a 3D key point, and the image capturing device finally determines camera posture information of the second image according to the coordinate information of the first 2D key point, the coordinate information of the second 2D key point, and the coordinate information of the 3D key point. The camera posture information is used for determining a position of the target object in the second image. By means of the foregoing manners, the impact of the coordinate information of the 3D key point and the coordinate information of the second 2D key point on the camera posture information are considered, and the coordinate information of the first 2D key point is also considered. In other words, 3D-2D correspondences and 2D-2D correspondences are combined in this solution, to obtain more key points during the estimation of camera posture information of the second image, so that in one aspect, errors in camera posture information are reduced, and in another aspect, a tracking loss because of an excessively small quantity of key points in tracking can be avoided.

Optionally, based on the embodiment corresponding to FIG. 4, in one embodiment, before the acquiring, by the image capturing device, coordinate information of a second 2D key point in the second image according to the coordinate information of the first 2D key point, the method may further include the following steps: determining, by the image capturing device, whether a quantity of second 2D key points in the second image reaches a threshold; and when the quantity of the second 2D key points reaches the threshold, triggering the operation of acquiring, by the image capturing device, coordinate information of a second 2D key point in the second image according to the coordinate information of the first 2D key point.

In one embodiment, a 2D-2D key point tracking algorithm used herein is a relatively mature and stable algorithm. If it is found that insufficient key points are successfully tracked, the system determines that tracking fails.

Specifically, the image capturing device first presets a threshold, for example, 50, and then determines whether a quantity of the key points from the first image to the second image reaches the threshold. In operation, there may be two determination manners. In the first manner, it is assumed that a number of the first 2D key points in the first image is 100, and the number of the second 2D key points in the second image is 70. The difference between the two numbers is 30. It is determined that the difference is less than the preset threshold. In the second manner, the number of the second key points in the second image is directly acquired. It is simpler to implement the second manner than the first manner because it is not necessary to count the key points in the two images, so that the system efficiency is improved.

In a case that the number of the second 2D key points reaches the threshold, the coordinate information of these second 2D key points may further be acquired.

It may be understood that when a new image is loaded subsequently, it is still necessary to detect whether the number of the key points that are successfully tracked is large enough (that is, compared with the preset threshold). If there are sufficient key points, the coordinate information of the key points continues to be acquired.

Next, in one embodiment of the present disclosure, before acquiring the coordinate information of the second 2D key points, the image capturing device needs to acquire the second 2D key points first, determines whether the number of the second 2D key points reaches the threshold, and continues to acquire the coordinate information of the second 2D key points when the number reaches the threshold. In the foregoing manner, it can be ensured that the number of the acquired second 2D key points reaches the threshold, to avoid a tracking loss because of an excessively small number of second 2D key points in tracking, thereby improving the practicability and feasibility of the solution.

Optionally, based on FIG. 4, in another embodiment, the acquiring, by the image capturing device, coordinate information of a second 2D key point in the second image according to the coordinate information of the first 2D key point may further include the following steps: determining the first 2D key point from the first image; determining the second 2D key point corresponding to the first 2D key point from the first image; and determining the coordinate information of the second 2D key point according to the coordinate information of the first 2D key point and displacement information, where the displacement information is a distance from the first 2D key point to the second 2D key point.

In one embodiment, how to acquire the coordinate information of the second 2D key point in the second image is described. Specifically, in one manner of acquiring the coordinate information of the second 2D key point, the first 2D key point is first obtained from the first image. Certainly, there are usually a plurality of first 2D key points. For ease of understanding, one of the first 2D key points may be used as an example for description.

In one embodiment, a Lucas-Kanade pyramidal tracking algorithm may be used to determine a coordinate position of the second 2D key point. It is assumed that there is a pyramid in the first image. The tip of the pyramid is the first 2D key point. The coordinate information of the first 2D key point is (a, b). Next, the camera displaces after one second, and the second image is obtained. The tip of the pyramid is still present in the second image, but has also displaced. The displacement includes an upward movement by $\alpha$ and a leftward movement by $\beta$. In this case, it can be obtained by using the displacement information that the coordinate information of the second 2D key point is (a+$\alpha$, b−$\beta$).

It may be understood that the coordinate information is only an example. In operation, the coordinate information may be represented in another manner, for example, by an angle. In addition, the coordinate information also has a corresponding representation manner. This is not limited herein.

Next, in one embodiment of the present disclosure, in the process of acquiring the coordinate information of the second 2D key point in the second image, the first 2D key point first needs to be determined from the first image, the second 2D key point is found from the second image, and the displacement information between the two key points is used to calculate the coordinate information of the second 2D key point. In the foregoing manner, the second 2D key point can be accurately located, to provide a feasible method for implementing the solution, thereby improving the practicability and operability of the solution.

Optionally, based on FIG. 4, in another embodiment, after determining, by the image capturing device, whether a number of second 2D key points in the second image reaches a threshold, the method may further include the following steps: when the number of the second 2D key points does not reach the threshold, acquiring, by the image capturing device, n key points from the first image, to enable a sum of the number of the second 2D key points and a number of the n key points to reach the threshold, where n is a positive integer, the n key points are acquired from a target area corresponding to the first image, the first image includes a plurality of equally divided areas, and a number of the key points in the target area is less than a preset key point threshold; and acquiring, by the image capturing device, coordinate information of the n key points and coordinate information of the second 2D key points in the second image according to the coordinate information of the first 2D key point and coordinate information of the n key points.

It may be understood that when a new image is loaded subsequently, it is still necessary to detect whether the number of the key points that are successfully tracked is large enough (that is, compared with the preset threshold). If there are insufficient key points, it is necessary to detect some more key points in areas with a relatively small number of corresponding key points (key points are detected in a previous frame of image of the current frame of image), and the current frame of image is tracked from the key points in the previous frame. In this way, the $k^{th}$ frame image has a similar processing manner.

Next, in one embodiment of the present disclosure, in the foregoing manner, it can be ensured that the number of the acquired second 2D key points reaches the threshold, to avoid a tracking loss because of an excessively small number of second 2D key points in tracking, thereby improving the flexibility and feasibility of the solution.

Optionally, based on FIG. 4, in another embodiment, the acquiring, by the image capturing device, coordinate information of the second 2D key points in the second image according to the coordinate information of the first 2D key point and coordinate information of the n key points includes the following steps: determining the first 2D key point and the n key points from the first image; determining the second 2D key points corresponding to the first 2D key point and the n key points from the first image; and determining the coordinate information of the n key points and the coordinate information of the second 2D key points in the second image according to the coordinate information of the first 2D key point, the coordinate information of the n key points, and displacement information, where the displacement information includes a distance from the first 2D key point to the second 2D key point and distances from the n key points to the second 2D key points.

In one embodiment, how to acquire the coordinate information of the second 2D key point in the second image and the coordinate information of n key points is described. Specifically, in one manner of acquiring the coordinate information of the second 2D key point, the first 2D key point is first obtained from the first image. Certainly, there are usually a plurality of first 2D key points. Meanwhile, n key points are acquired from the first image, where n is a positive integer.

It is assumed that one 2D key point is found in the first image. The 2D key point is any one of the first 2D key point and the n key points. Similarly, by means of the second optional embodiment corresponding to FIG. 4, the coordinate information of the second 2D key point may be determined according to the displacement information and the key point information. This is not described in detail herein.

Optionally, based on FIG. 4, in another, after the determining the camera posture information of the second image, the method may further include the following steps: performing, by the image capturing device, triangulation processing on the coordinate information of the first 2D key point, the coordinate information of the second 2D key points, camera posture information of the first image, and the camera posture information of the second image, and obtaining a 3D key point to be selected and coordinate information of the 3D key point to be selected; determining, by the image capturing device, an observation angle according to the 3D key point to be selected, where the observation angle is an angle between a connecting line between a center point in the first image and the 3D key point to be selected and a connecting line between a center point in the second image and the 3D key point to be selected; and when the observation angle is greater than a preset angle, determining, by the image capturing device, the coordinate information of the 3D key point to be selected as coordinate information of a target 3D key point.

In one embodiment, how to determine a target 3D key point in a subsequent image and coordinate information corresponding to the target 3D key point is described.

Specifically, the coordinate information of the first 2D key point and the coordinate information of the second 2D key point are first acquired, the pre-obtained camera posture information corresponding to the first image is then acquired, and the camera posture information corresponding to the second image obtained in step 104 is acquired. The four pieces of information are combined to perform triangulation processing, and the target 3D key point is obtained.

Figure 5:
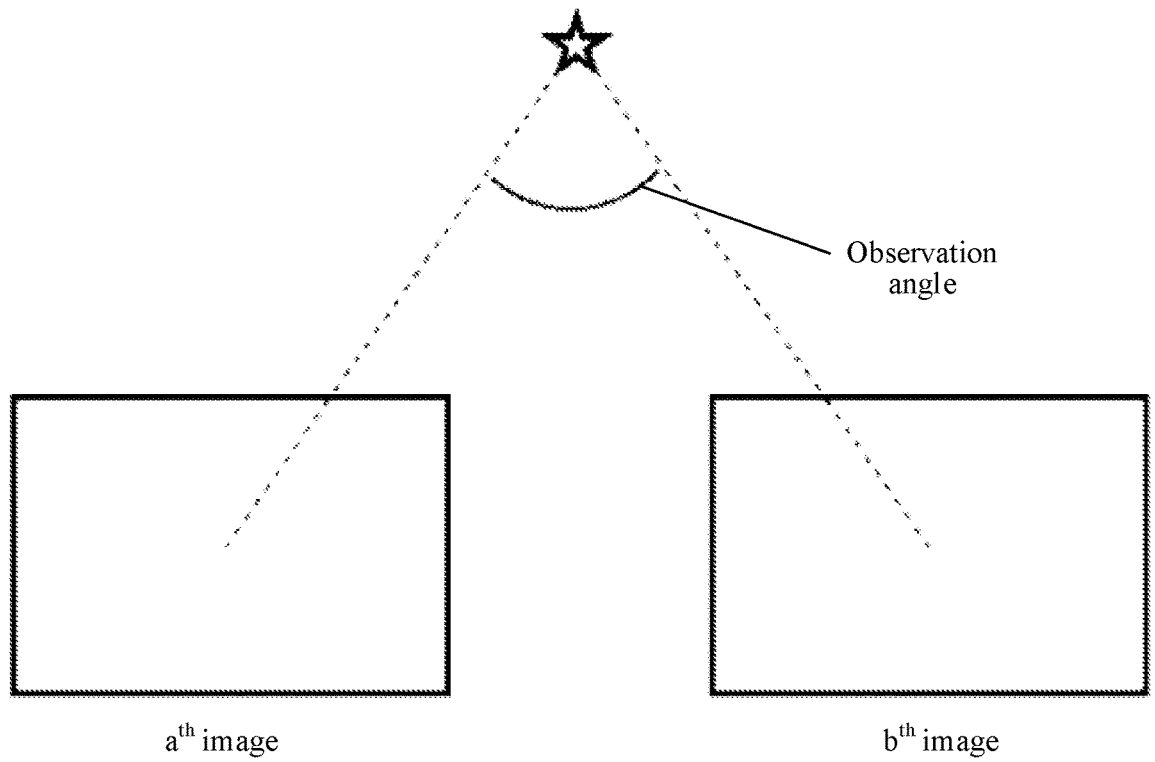
FIG. 5 is a schematic diagram of determining an observation angle according to an embodiment of the present disclosure.

Herein, an observation angle in triangulation needs to be estimated. For ease of understanding, referring to FIG. 5, FIG. 5 is a schematic diagram of determining an observation angle according to an embodiment of the present disclosure. As shown in FIG. 5, the observation angle is an angle of observing the target 3D key point from the positions of the center points of two images. In a case that most of the observation angles corresponding to these target 3D key points are excessively small, it may indicate that current initialization has relatively large errors. In this case, the system needs to be labeled as "initialization fails". Initialization is attempted again when a subsequent frame is loaded subsequently.

Next, in one embodiment of the present disclosure, in the manner in which the image capturing device determines the coordinate information of a 3D key point, coordinate information of a 3D key point to be selected may be obtained first, and an observation angle of the 3D key point to be selected is then obtained. In a case that the observation angle is greater than a preset angle, the coordinate information of the 3D key point to be selected is determined as the coordinate information of the target 3D key point. In the foregoing manner, a target 3D key point whose observation angle is greater than a preset angle may be selected. In a case that an observation angle is large, it may indicate that the initialization of a SLAM system has a small error, thereby improving the practicability and operability of the solution.

Optionally, based on FIG. 4, in another embodiment, after the acquiring, by the image capturing device, coordinate information of a second 2D key point in the second image according to the coordinate information of the first 2D key point, the method may further include the following steps: generating, by the image capturing device, a tracking record, where the tracking record is used for recording coordinate information of 2D key points in a plurality of images, the first image in the tracking record is the first image, the last image in the tracking record is the second image, and at least one image is included between the first image and the second image.

Figure 6:
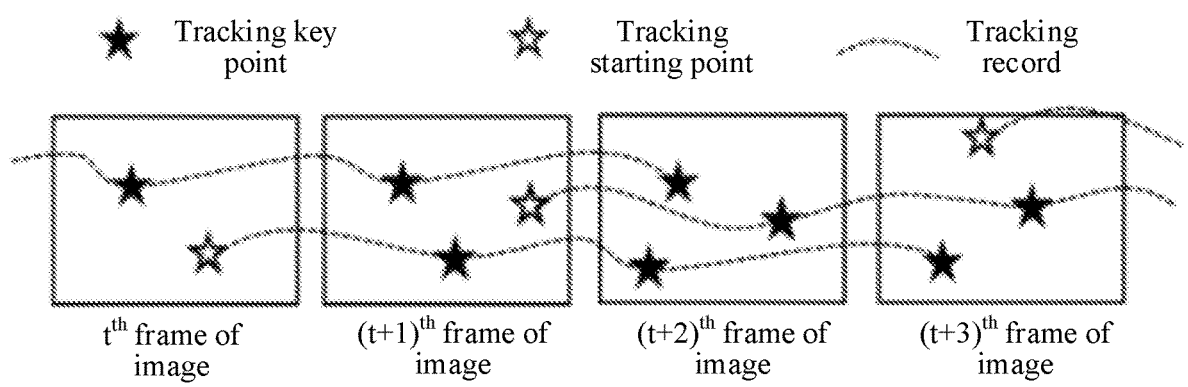
FIG. 6 is a schematic diagram of generating a tracking record according to an embodiment of the present disclosure.

In one embodiment, how to generate a tracking record corresponding to a key point is described in detail. For ease of understanding, referring to FIG. 6, FIG. 6 is a schematic diagram of generating a tracking record according to an embodiment of the present disclosure. As shown in the figure, four frames of image are shown, and are a $t^{th}$ frame of image, a $(t+1)^{th}$ frame of image, a $(t+2)^{th}$ frame of image, and a $(t+3)^{th}$ frame of image. A solid star represents a key point of tracking, a hollow star represents a starting point of tracking, and a dotted line represents a tracking record.

In the system, starting from a detected key point in a frame, n frames of image are continuously tracked until the tracking is lost, and an entire obtained trajectory is referred to as one tracking record. Data such as frame numbers of images that the key point passes through, 2D coordinates of the key point in corresponding frames, whether triangulation succeeds, whether the key point has a corresponding 3D point, and the largest observation angle of the key point observed in different frames is recorded in the data structure in each tracking record.

The tracking record is related to the first image and the second image. Herein, the first image is the first image in the tracking record, and the second image is the last image in the tracking record. Therefore, it may be considered that at least one image is included between the first image and the second image.

Next, in the foregoing manner, a tracking record including coordinate information of a 2D key point in a plurality of images can be obtained. The tracking record can track a 2D key point that passes through the images, so that it is convenient to rapidly and accurately acquire from the tracking record the coordinate information of a 2D key point corresponding to required images, thereby improving the feasibility of the solution.

Optionally, based on FIG. 4, in another embodiment, the image capturing device acquires coordinate information of a 3D key point corresponding to the target object may include the following steps: acquiring coordinate information of a third 2D key point of the target object and coordinate information of a fourth 2D key point of the target object according to the tracking record, where the third 2D key point belongs to a third image, the fourth 2D key point belongs to a fourth image, and the third image and the fourth image are both located between the first image and the second image; performing triangulation processing on the coordinate information of the first 2D key point and the coordinate information of the third 2D key point, and obtaining coordinate information of a first 3D key point; performing triangulation processing on the coordinate information of the third 2D key point and the coordinate information of the fourth 2D key point, and obtaining coordinate information of a second 3D key point; determining a first observation angle according to the coordinate information of the first 3D key point, and determining a second observation angle according to the coordinate information of the second 3D key point, where the first observation angle is an angle between a connecting line between a center point in the first image and the first 3D key point and a connecting line between a center point in the third image and the first 3D key point, and the second observation angle is an angle between a connecting line between a center point in the second image and the second 3D key point and a connecting line between a center point in the third image and the second 3D key point; when the first observation angle is greater than the second observation angle, determining the coordinate information of the first 3D key point as the coordinate information of the 3D key point of the target object; and when the second observation angle is greater than the first observation angle, determining the coordinate information of the second 3D key point as the coordinate information of the 3D key point of the target object.

In one embodiment, how to use a tracking record to obtain an optimal 3D key point is described. Generally, a tracking record includes information of a plurality of frames of image. Therefore, a 3D key point is calculated between every two images, and an optimal 3D key point is finally selected. The plurality of frames of image herein may be key frames of image. The SLAM system uses a technology based on key frames to reduce a data amount of historical data to be maintained. Key frames may be selected and managed in a simple regular frame skipping manner. For example, one of every m frames is selected as a key frame. Certainly, some simple heuristic checks need to be performed on the key frames. Only key frames with a relatively large amount of information are kept.

Specifically, the coordinate information of the third 2D key point and the coordinate information of the fourth 2D key point are acquired according to the tracking record, where the third 2D key point belongs to a third image, the fourth 2D key point belongs to a fourth image, and the third image and the fourth image are both located between the first image and the second image. Next, triangulation processing is performed on the coordinate information of the first 2D key point, the coordinate information of the third 2D key point, camera posture information of the first image, and camera posture information of the third image, and the coordinate information of the first 3D key point is obtained. Triangulation processing is performed on the coordinate information of the third 2D key point, the coordinate information of the fourth 2D key point, camera posture information of the third image, and camera posture information of the fourth image, and the coordinate information of the second 3D key point is obtained. In operation, triangulation processing can also be performed on the coordinate information of the first 2D key point and the coordinate information of the fourth 2D key point, and the coordinate information of the third 3D key point is obtained. At this point, the coordinate information of a 3D key point corresponding to every two images is obtained.

In this case, according to the method for determining an observation angle described in the fifth optional embodiment corresponding to FIG. 4, a first observation angle corresponding to a first 3D key point, a second observation angle corresponding to a second 3D key point, and a third observation angle corresponding to a third 3D key point may be separately obtained. The first observation angle, the second observation angle, and the third observation angle are compared to select the largest observation angle. A 3D key point corresponding to the largest observation angle is the required 3D key point.

It may be understood that one embodiment is described by using an example of comparing three observation angles. However, this does not constitute any limitation on this solution.

Again, in one embodiment of the present disclosure, in the process in which the image capturing device determines the coordinate information of the 3D key point, a tracking record is used to separately acquire 2D key points in a plurality of frames of image, triangulation processing is then performed on 2D key points in every two images to obtain a plurality of 3D key points. These 3D key points separately correspond to one observation angle. A 3D key point with the largest observation angle is finally selected. In the foregoing manner, the 3D key point corresponding to the largest observation angle may be obtained according to the tracking record. In a case that an observation angle is large, it may indicate that the initialization of a SLAM system has a small error, thereby improving the practicability and operability of the solution.

Optionally, based on FIG. 4, in another embodiment, the determining camera posture information of the second image according to the coordinate information of the first 2D key point, the coordinate information of the second 2D key point, and the coordinate information of the 3D key point may include the following steps: acquiring, by the image capturing device, a 3D-2D projection error according to the coordinate information of the 3D key point; acquiring, by the image capturing device, a 2D-2D epipolar distance according to the coordinate information of the first 2D key point and the coordinate information of the second 2D key point; and calculating, by the image capturing device, a target function according to the 3D-2D projection error and the 2D-2D epipolar distance, and finding the minimum of the target function, to obtain the camera posture information of the second image.

In one embodiment, how to acquire the camera posture information of the second image is described.

It may be understood that herein, the first image may be the first frame of image in the tracking record, and the second image may be the last frame of image in the tracking record.

A projection error is often used in computer vision. For example, during the calculation of a planar homography matrix and a projection matrix, a reprojection error is usually used to build a cost function, and the cost function is then minimized to optimize the homography matrix or projection matrix. The projection error is used because it takes both a calculation error of a homography matrix and a measurement error of an image point into consideration. Therefore, the precision of using the projection error is higher than the precision of using a one-sided error or a symmetric transfer error.

Originating from a structure from motion problem, an epipolar distance is a special geometric relationship that exists between two images generated at two camera positions, and is a basic model for solving a 2D-2D camera pose between frames. With an epipolar distance model, the 2D-2D camera pose may be solved by using the following process.

A plurality of corresponding points are used to perform frame matching, to calculate an elementary matrix. The elementary matrix is then decomposed to calculate an extrinsic parameter, to obtain a rotation amount and a translation amount, which may also be considered as a camera pose.

Furthermore, in one embodiment of the present disclosure, more accurate camera posture information can be obtained in the foregoing manner. The camera posture information is a minimum solution value of the target function and may be considered as an optimal solution. Therefore, the position of the target object in the second image can be more accurate.

Optionally, based on FIG. 4, in another embodiment, the acquiring, by the image capturing device, a 3D-2D projection error according to the coordinate information of the 3D key point in the second image and the coordinate information of the second 2D key point, the method may further include the following steps:

calculating the 3D-2D projection error by using the following formula:

$$A = \sum_{i \in C_{3D2D}} \|u_i - \pi_x(p_i)\|_2^2,$$

where A denotes the 3D-2D projection error, $C_{3D2D}$ denotes a set of 3D key points projected on the second image, $u_i$ denotes the coordinate information of the second 2D key point, $\pi_x$ denotes a projection function for 3D-2D projection, the projection function and the camera posture information have an association relationship, and $p_i$ denotes the coordinate information of the 3D key point; the acquiring a 2D-2D epipolar distance according to the coordinate information of the first 2D key point and the coordinate information of the second 2D key point includes:

calculating the 2D-2D epipolar distance by using the following formula:

$$B = \lambda \sum_{i \in C_{2D2D}} \frac{(u_i' F_x u_i)^2}{(F_x u_i)_1^2 + (F_x u_i)_2^2 + (F_x u_i')_1^2 + (F_x u_i')_2^2},$$

where B denotes the 2D-2D epipolar distance, $C_{2D2D}$ denotes a set of the second 2D key points and the first 2D key points, $\lambda$ denotes a preset equilibrium constant, the preset equilibrium constant is used for keeping a difference between 2D-2D epipolar distance and the 3D-2D projection error within a preset range, $u'_i$ denotes the coordinate information of the first 2D key point, $F_x$ denotes an elementary matrix between the second image and the first image, and the projection function and the camera posture information have an association relationship; and the calculating a target function according to the 3D-2D projection error and the 2D-2D epipolar distance may include:

calculating the target function by using the following formula:

$$E(x) = \sum_{i \in C_{3D2D}} \|u_i - \pi_x(p_i)\|_2^2 + \lambda \sum_{i \in C_{2D2D}} \frac{(u_i' F_x u_i)^2}{(F_x u_i)_1^2 + (F_x u_i)_2^2 + (F_x u_i')_1^2 + (F_x u_i')_2^2},$$

where E(x) denotes the target function, and x denotes the camera posture information of the second image.

In one embodiment, 3D is the previous 3D key points that have been successfully triangulated, and 2D is 2D image coordinates in the current frame that correspond to those 3D key points observed in the current frame. A new target function is proposed herein and includes both a 3D-2D projection error and a 2D-2D epipolar distance. In this way, the new target function is minimized to solve the camera posture information.

It is assumed that the camera posture information to be solved is x, where x includes a rotation amount R and a translation amount t. The target function is as follows (Note that in the following the coordinates of both a 2D key point and a 3D key point are in the form of homogeneous coordinates. For example, the homogeneous coordinates of a 2D key point $[x,y]^T$ are $[x,y,1]^T$ the homogeneous coordinates of a 3D key point $[x,y,z]^T$ are $[x,y,z,1]^T$. The symbol T herein represents the transpose of a matrix or vector.

First, the 3D-2D projection error is calculated by using the following formula:

$$A = \sum_{i \in C_{3D2D}} \|u_i - \pi_x(p_i)\|_2^2, \qquad (1)$$

where, A denotes the 3D-2D projection error, $\| \|_2$ denotes the norm of 2, $C_{3D2D}$ denotes a set of 3D key points projected on the second image, denotes the coordinate information of the second 2D key point, $\pi_x$ denotes a projection function for 3D-2D projection, the projection function and the camera posture information have an association relationship, and $p_i$ denotes the coordinate information of the 3D key point.

Next, the 2D-2D epipolar distance is calculated by using the following formula:

$$B = \lambda \sum_{i \in C_{2D2D}} \frac{(u_i' F_x u_i)^2}{(F_x u_i)_1^2 + (F_x u_i)_2^2 + (F_x u_i')_1^2 + (F_x u_i')_2^2} \qquad (2)$$

where B denotes the 2D-2D epipolar distance, $C_{2D2D}$ denotes a set of the second 2D key points and the first 2D key points, $\lambda$ denotes a preset equilibrium constant, the preset equilibrium constant is used for keeping a difference between 2D-2D epipolar distance and the 3D-2D projection error within a preset range, $u'_i$ denotes the coordinate information of the first 2D key point, $F_x$ denotes an elementary matrix between the second image and the first image, and the projection function and the camera posture information have an association relationship.

The algorithm $(v)_j$ in Formula (2) represents taking the $j^{th}$ element in the vector v.

Finally, Formula (1) and Formula (2) are combined to calculate the target function:

$$E(x) = \sum_{i \in C_{3D2D}} \|u_i - \pi_x(p_i)\|_2^2 + \lambda \sum_{i \in C_{2D2D}} \frac{(u_i' F_x u_i)^2}{(F_x u_i)_1^2 + (F_x u_i)_2^2 + (F_x u_i')_1^2 + (F_x u_i')_2^2}, \quad (3)$$

where E (x) denotes the target function, and x denotes the camera posture information of the second image.

Formula (2) is in fact an approximate epipolar distance named a Sampson distance. λ in Formula (3) is a weight value for balancing Formula (1) and Formula (2), and may be selected according to an actual experimental effect. The target function is a form based on a quadratic cost. To achieve a more stable effect, the target function may be robustified in actual use. For example, a Huber function is used to separately robustify two items of the target function.

The minimum of the target function is found to make the solution valid. x is parameterized, and a non-linear least square method (Levenberg-Marquardt, LM) is used to find the solution. During the optimized solution finding, a rough initial value of x is first obtained by using another method, and iterative optimization is then performed to avoid falling into a local optimal solution.

Furthermore, in one embodiment of the present disclosure, specific calculation formulas are provided. The 3D-2D projection error and the 2D-2D epipolar distance are separately calculated according to corresponding formulas, and are combined to obtain the target function. In the foregoing manner, the reliability of obtaining a target function can be improved, thereby improving the feasibility and practicability of the solution.

Figure 7:
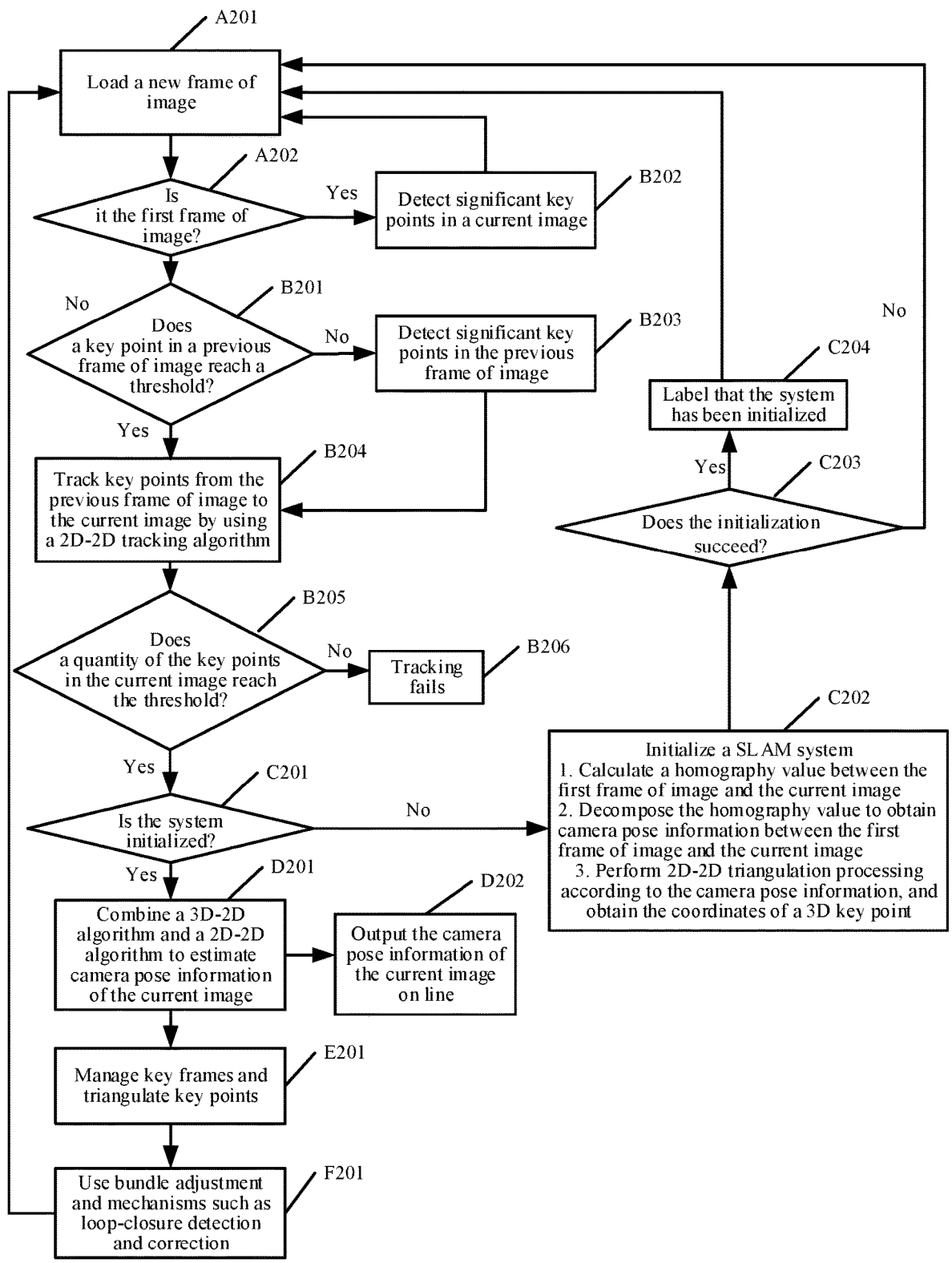
FIG. 7 is a schematic flowchart of determining camera posture information in an application scenario according to an embodiment of the present disclosure.

For ease of understanding, the following may describe a process of determining camera posture information in the embodiments of the present disclosure in detail by using a specific application scenario. Referring to FIG. 7, FIG. 7 is a schematic flowchart of determining camera posture information in an application scenario according to an embodiment of the present disclosure. The procedure may include the followings.

A201. Start loading a new frame of image first.

A202. Determine whether the loaded new frame of image is the first frame of image, and if yes, perform B202, or if not, perform B201.

B201. Continue to determine whether a key point in a previous frame of image reaches a threshold, and if yes, perform B204, or if not, perform B203.

B202. In the SLAM system in one embodiment of the present disclosure, manage the detection and tracking of key points based on areas and tracking records. For example, starting from the first frame of image I1, significant key points are detected from the image first, the image is then divided into regular areas, and a correspondence between the key points and areas in which the key points are located is established.

B203. After a new frame of image I3 is loaded, it is necessary to first detect whether the number of the key points that are successfully tracked in the previous frame I2 is large enough (that is, compared with the preset threshold). If there are insufficient key points, it is necessary to detect some more key points in areas with a relatively small number of corresponding key points. Key points are detected in I2 herein.

B204. Track the current frame I3 from key points in I2. In this way, the $k^{th}$ frame image has a similar processing manner. After a new frame of image I2 is loaded, for key points in the image I1, a 2D-2D key point tracking algorithm is used to calculate 2D positions of these key points in the current frame I2.

B205. Determine whether a number of the key points in a current image reaches the threshold, and if yes, perform C201, or if not, perform B206.

B206. Determine that the system fails tracking.

C201. Further determine whether the system is initialized, and if yes, perform D201, or if not, perform C202.

C202. A classic homography-based method is used as the initialization method herein. Generally, before the system has been initialized, the coordinates of 2D key points in the current frame that are of successfully tracked key points in the current frame and the coordinates of 2D key points in the first frame that are of the successfully tracked key points as well as a Random Sample Consensus (RANSAC) algorithm are used to calculate a homography matrix. The homography matrix is then decomposed to obtain a correlated photographing pose (correlated location information) of the current frame relative to the first frame. Finally, the obtained correlated photographing pose is used to perform triangulation on 2D-2D correspondences to obtain the coordinates of the corresponding 3D key points. Herein, it is necessary to estimate observation angles in triangulation. In a case that most of the observation angles corresponding to these 3D key points are excessively small, it may indicate that current initialization has relatively large errors. In this case, the system needs to be labeled as "initialization fails". Initialization is attempted again when a subsequent frame is loaded subsequently.

C203. Determine whether initialization succeeds, and if yes, perform C204, or if not, perform A201.

C204. Label that the system has been successfully initialized.

D201. Propose a new target function that includes both a 3D-2D projection error and a 2D-2D epipolar distance herein. In this way, the new target function is minimized to solve the camera posture information.

D202. Output online the camera posture information obtained in D201.

E201. The system uses a technology based on key frames to reduce a data amount of historical data to be maintained (Key frames may be selected and managed in a simple regular frame skipping manner. For example, one of every m frames is selected as a key frame. Certainly, some simple heuristic checks need to be performed on the key frames. Only key frames with a relatively large amount of information are kept). In a key frame, a tracking record that has not been triangulated is triangulated by using a starting point and an end point of the tracking record, so as to calculate 3D key points corresponding to the tracking record. Observation angles of the 3D key points are checked, and 3D points with a relatively large observation angle are kept. This step may be performed for every frame instead of being performed for only key frames. This may be adjusted according to an actual calculation speed.

F201. Add local or global bundle adjustment and mechanisms such as loop-closure detection and correction to the system to improve the precision of the entire system. These modules are relatively independent and may be added flexibly similar to an existing SLAM system.

Figure 8:
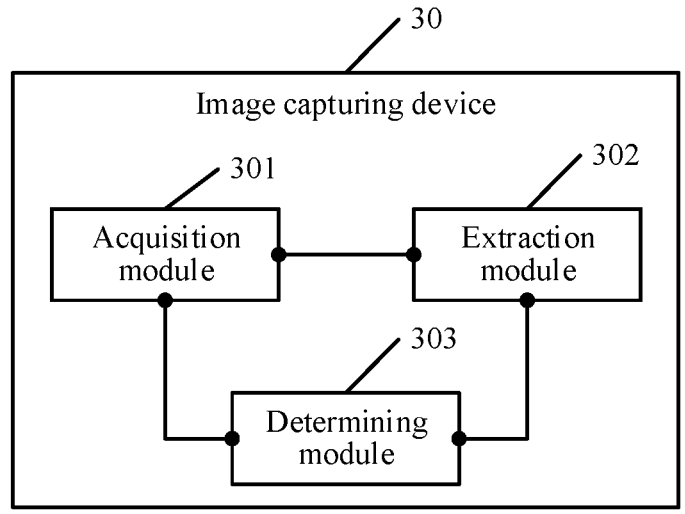
FIG. 8 is a schematic diagram of an image capturing device according to an embodiment of the present disclosure.

The image capturing device in the embodiments of the present disclosure are described below in detail. Referring to FIG. 8, the image capturing device 30 in one embodiment of the present disclosure includes one or more processors and one or more memories storing program units/modules, the program units being executed by the processor, and the program units include: an acquisition module 301, an extraction module 302, and a determining module 303.

The acquisition module 301 is configured to obtain a first image of a target object. The extraction module 302 is configured to extract coordinate information of a first 2D key point corresponding to the target object from the first image acquired by the acquisition module 301.

Further, the acquisition module 301 is configured to acquire a second image of the target object. The acquisition module 301 may further be configured to acquire coordinate information of a second 2D key point in the second image according to the coordinate information of the first 2D key point extracted by the extraction module 302, the first 2D key point and the second 2D key point being the same key point in the target object. The acquisition module 301 may also further be configured to acquire coordinate information of a 3D key point corresponding to the target object, the 3D key point being a key point obtained after triangulation processing.

The determining module 303 is configured to determine camera posture information of the second image according to the coordinate information of the first 2D key point extracted by the extraction module 302 and the coordinate information of the second 2D key point and the coordinate information of the 3D key point that are acquired by the acquisition module 301, the camera posture information being used for determining a position of the target object in the second image.

Figure 9:
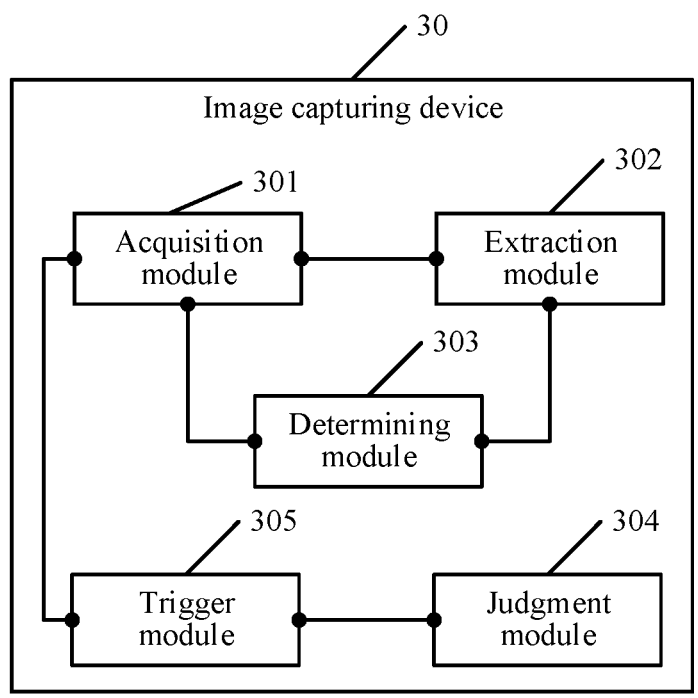
FIG. 9 is a schematic diagram of an image capturing device according to another embodiment of the present disclosure.

Optionally, based on FIG. 8, referring to FIG. 9, in another embodiment, the program units further includes: a judgment module 304, and a trigger module 305.

The judgment module 304 is configured to: before the acquisition module 301 acquires the coordinate information of the second 2D key point in the second image according to the coordinate information of the first 2D key point, determine whether a number of second 2D key points in the second image reaches a threshold; and The trigger module 305 is configured to: when the judgment module 304 determines that the number of the second 2D key points reaches the threshold, trigger the operation of acquiring the coordinate information of the second 2D key point in the second image according to the coordinate information of the first 2D key point.

Optionally, based on FIG. 8 or FIG. 9, in another embodiment, the determining module 303 is specifically configured to: determine the first 2D key point from the first image; determine the second 2D key point corresponding to the first 2D key point from the first image; and determine the coordinate information of the second 2D key point according to the coordinate information of the first 2D key point and displacement information, where the displacement information is a distance from the first 2D key point to the second 2D key point.

Optionally, based on FIG. 9, in another embodiment, when the number of the second 2D key points does not reach the threshold, the acquisition module 301 is further configured to: acquire n key points from the first image, to enable a sum of the number of the second 2D key points and a number of the n key points to reach the threshold, where n is a positive integer, the n key points are acquired from a target area corresponding to the first image, the first image includes a plurality of equally divided areas, and a number of the key points in the target area is less than a preset key point threshold; and acquire coordinate information of the n key points and coordinate information of the second 2D key points in the second image according to the coordinate information of the first 2D key point and coordinate information of the n key points.

Optionally, based on FIG. 9, in another embodiment, the determining module 303 is specifically configured to: determine the first 2D key point and the n key points from the first image; determine the second 2D key points corresponding to the first 2D key point and the n key points from the first image; and determine the coordinate information of the n key points and the coordinate information of the second 2D key points in the second image according to the coordinate information of the first 2D key point, the coordinate information of the n key points, and displacement information, where the displacement information includes a distance from the first 2D key point to the second 2D key point and distances from the n key points to the second 2D key points.

Optionally, based on FIG. 8, in another embodiment, the determining module 302 is further configured to: after the camera posture information of the second image is determined, perform triangulation processing on the coordinate information of the first 2D key point, the coordinate information of the second 2D key points, camera posture information of the first image, and the camera posture information of the second image, and obtain a 3D key point to be selected and coordinate information of the 3D key point to be selected; determine an observation angle according to the 3D key point to be selected, where the observation angle is an angle between a connecting line between a center point in the first image and the 3D key point to be selected and a connecting line between a center point in the second image and the 3D key point to be selected; and when the observation angle is greater than a preset angle, determine the coordinate information of the 3D key point to be selected as coordinate information of a target 3D key point.

Next, in one embodiment of the present disclosure, in the manner in which the image capturing device determines the coordinate information of a 3D key point, triangulation processing may be first performed on the coordinate information of the first 2D key point and the coordinate information of the second 2D key point, coordinate information of a 3D key point to be selected may be obtained, and an observation angle of the 3D key point to be selected is then obtained. In a case that the observation angle is greater than a preset angle, the coordinate information of the 3D key point to be selected is determined as the coordinate information of the target 3D key point. In the foregoing manner, a target 3D key point whose observation angle is greater than a preset angle may be selected. In a case that an observation angle is large, it may indicate that the initialization of a SLAM system has a small error, thereby improving the practicability and operability of the solution.

Figure 10:
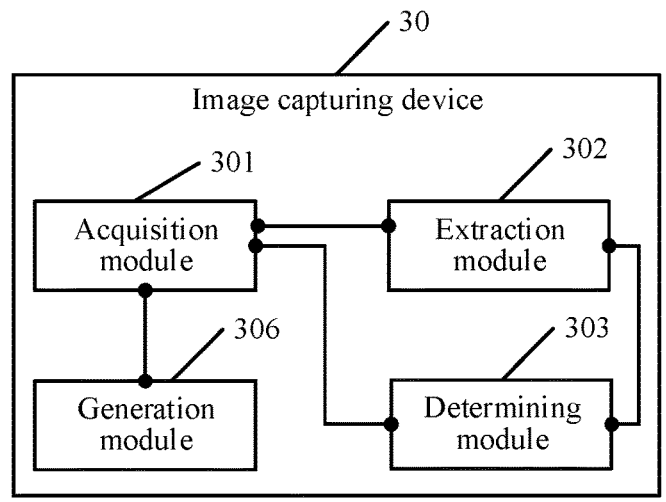
FIG. 10 is a schematic diagram of an image capturing device according to another embodiment of the present disclosure.

Optionally, based on FIG. 8, referring to FIG. 10, in another embodiment, the program units further includes a generation module 306.

The generation module 306 is configured to: after the acquisition module 301 acquires the coordinate information of the second 2D key point in the second image according to the coordinate information of the first 2D key point, generate a tracking record, where the tracking record is used for recording coordinate information of 2D key points in a plurality of images, the first image in the tracking record is the first image, the last image in the tracking record is the second image, and at least one image is included between the first image and the second image.

Optionally, based on FIG. 10, in another embodiment, the acquisition module 301 is specifically configured to: acquire coordinate information of a third 2D key point of the target object and coordinate information of a fourth 2D key point of the target object according to the tracking record, where the third 2D key point belongs to a third image, the fourth 2D key point belongs to a fourth image, and the third image and the fourth image are both located between the first image and the second image; perform triangulation processing on the coordinate information of the first 2D key point and the coordinate information of the third 2D key point, and obtain coordinate information of a first 3D key point; perform triangulation processing on the coordinate information of the third 2D key point and the coordinate information of the fourth 2D key point, and obtain coordinate information of a second 3D key point; determine a first observation angle according to the coordinate information of the first 3D key point, and determine a second observation angle according to the coordinate information of the second 3D key point, where the first observation angle is an angle between a connecting line between a center point in the first image and the first 3D key point and a connecting line between a center point in the third image and the first 3D key point, and the second observation angle is an angle between a connecting line between a center point in the second image and the second 3D key point and a connecting line between a center point in the third image and the second 3D key point; when the first observation angle is greater than the second observation angle, determine the coordinate information of the first 3D key point as the coordinate information of the 3D key point of the target object; and when the second observation angle is greater than the first observation angle, determine the coordinate information of the second 3D key point as the coordinate information of the 3D key point of the target object.

Optionally, based on FIG. 8, FIG. 9, or FIG. 10, in another embodiment, the determining module 303 is specifically configured to: acquire a 3D-2D projection error according to the coordinate information of the 3D key point; acquire a 2D-2D epipolar distance according to the coordinate information of the first 2D key point and the coordinate information of the second 2D key point; and calculate a target function according to the 3D-2D projection error and the 2D-2D epipolar distance, and find the minimum of the target function, to obtain the camera posture information of the second image.

Optionally, based on FIG. 8, FIG. 9, or FIG. 10, in another embodiment, the determining module 303 is specifically configured to calculate the 3D-2D projection error by using the following formula:

$$A = \sum_{i \in C_{3D2D}} \|u_i - \pi_x(p_i)\|_2^2,$$

where A denotes the 3D-2D projection error, $C_{3D2D}$ denotes a set of 3D key points projected on the second image, $u_i$ denotes the coordinate information of the second 2D key point, $\pi_x$ denotes a projection function for 3D-2D projection, the projection function and the camera posture information have an association relationship, and $p_i$ denotes the coordinate information of the 3D key point.

The determining module 303 is specifically configured to calculate the 2D-2D epipolar distance by using the following formula:

$$B = \lambda \sum_{i \in C_{2D2D}} \frac{(u_i' F_x u_i)^2}{(F_x u_i)_1^2 + (F_x u_i)_2^2 + (F_x u_i')_1^2 + (F_x u_i')_2^2},$$

where B denotes the 2D-2D epipolar distance, $C_{2D2D}$ denotes a set of the second 2D key points and the first 2D key points, $\lambda$ denotes a preset equilibrium constant, the preset equilibrium constant is used for keeping a difference between 2D-2D epipolar distance and the 3D-2D projection error within a preset range, $u_i'$ denotes the coordinate information of the first 2D key point, $F_x$ denotes an elementary matrix between the second image and the first image, and the projection function and the camera posture information have an association relationship.

The determining module 303 is specifically configured to calculate the target function by using the following formula:

$$E(x) = \sum_{i \in C_{3D2D}} \|u_i - \pi_x(p_i)\|_2^2 + \lambda \sum_{i \in C_{2D2D}} \frac{(u_i' F_x u_i)^2}{(F_x u_i)_1^2 + (F_x u_i)_2^2 + (F_x u_i')_1^2 + (F_x u_i')_2^2},$$

where E(x) denotes the target function, and x denotes the camera posture information of the second image.

Figure 11:
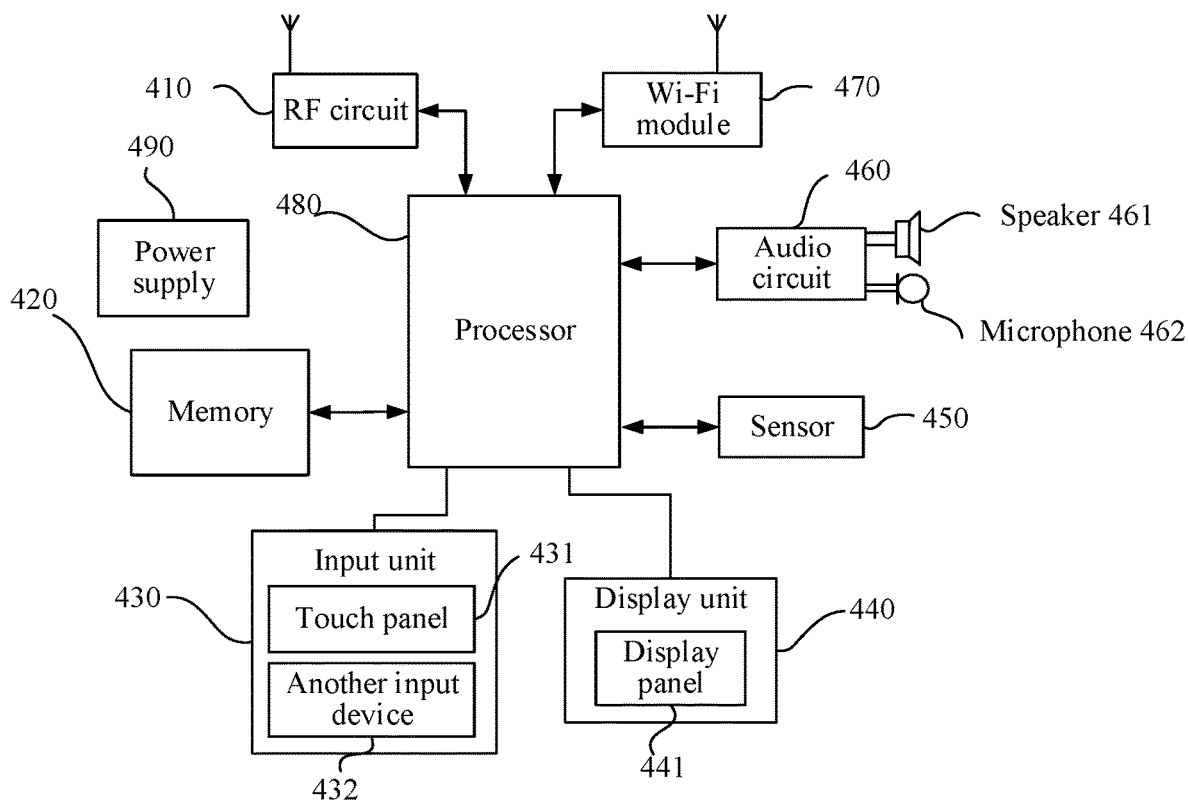
FIG. 11 is a schematic structural diagram of an electronic device according to an embodiment of the present disclosure.

An embodiment of the present disclosure further provides another electronic device. The electronic device may be, for example, an image capturing device. As shown in FIG. 11, for ease of description, only parts related to the embodiments of the present disclosure are shown. For specific technical details that are not disclosed, refer to the method part in the embodiments of the present disclosure. The image capturing device may be a terminal. The terminal may be any terminal device including a mobile phone, a tablet computer, a personal digital assistant (PDA), a point of sales (POS), and an on-board computer, and the terminal being a mobile phone is used as an example.

FIG. 11 is a partial structural block diagram of a mobile phone related to a terminal according to an embodiment of the present disclosure. Referring to FIG. 11, the mobile phone includes components such as a radio frequency (RF) circuit 410, a memory 420, an input unit 430, a display unit 440, a sensor 450, an audio circuit 460, a Wi-Fi module 470, a processor 480, and a power supply 490. A person skilled in the art may understand that the structure of the mobile phone shown in FIG. 11 does not constitute a limitation on the mobile phone, and the mobile phone may include more components or fewer components than those shown in the figure, or some components may be combined, or a different component deployment may be used.

The following makes a specific description of components of the mobile phone with reference to FIG. 11.

The RF circuit 410 may be configured to receive and send signals during an information receiving and sending process or a call process. Specifically, the RF circuit 410 receives downlink information from a base station, then delivers the downlink information to the processor 480 for processing, and sends designed uplink data to the base station. Usually, the RF circuit 410 includes, but is not limited to, an antenna, at least one amplifier, a transceiver, a coupler, a low noise amplifier (LNA), and a duplexer. In addition, the RF circuit 410 may also communicate with a network and another device by wireless communication. The wireless communication may use any communication standard or protocol, including but not limited to Global System for Mobile communications (GSM), general packet radio service (GPRS), Code Division Multiple Access (CDMA), Wideband Code Division Multiple Access (WCDMA), Long Term Evolution (LTE), email, Short Messaging Service (SMS), and the like.

The memory 420 may be configured to store a software program and module. The processor 480 runs the software program and module stored in the memory 420, to implement various functional applications and data processing of the mobile phone. The memory 420 may mainly include a program storage area and a data storage area. The program storage area may store an operating system, an application program required by at least one function (such as a sound playback function and an image display function), and the like. The data storage area may store data (such as audio data and an address book) created according to the use of the mobile phone, and the like. In addition, the memory 420 may include a high speed random access memory, and may also include a non-volatile memory, such as at least one magnetic disk storage device, a flash memory, or another volatile solid-state storage device.

The input unit 430 may be configured to receive input digit or character information, and generate a key signal input related to the user setting and function control of the mobile phone. Specifically, the input unit 430 may include a touch panel 431 and another input device 432. The touch panel 431 may also be referred to as a touchscreen, and may collect a touch operation of a user on or near the touch panel (such as an operation of a user on or near the touch panel 431 by using any suitable object or attachment, such as a finger or a stylus), and drive a corresponding connection apparatus according to a preset program. Optionally, the touch panel 431 may include two parts, namely, a touch detection apparatus and a touch controller. The touch detection apparatus detects a touch position of the user, detects a signal generated by the touch operation, and transfers the signal to the touch controller. The touch controller receives the touch information from the touch detection apparatus, converts the touch information into touch point coordinates, and sends the touch point coordinates to the processor 480. Moreover, the touch controller can receive and execute a command sent from the processor 480. In addition, the touch panel 431 may be implemented by using various types, such as a resistive type, a capacitance type, an infrared type, and a surface sound wave type. In addition to the touch panel 431, the input unit 430 may further include the another input device 432. Specifically, the another input device 432 may include, but is not limited to, one or more of a physical keyboard, a functional key (such as a volume control key or a switch key), a track ball, a mouse, and a joystick.

The display unit 440 may be configured to display information input by the user or information provided for the user, and various menus of the mobile phone. The display unit 440 may include a display panel 441. Optionally, the display panel 441 may be configured by using a liquid crystal display (LCD), an organic light-emitting diode (OLED), or the like. Further, the touch panel 431 may cover the display panel 441. After detecting a touch operation on or near the touch panel 431, the touch panel 431 transfers the touch operation to the processor 480, to determine a type of a touch event. Then, the processor 480 provides a corresponding visual output on the display panel 441 according to the type of the touch event. Although in FIG. 11, the touch panel 431 and the display panel 441 are used as two separate parts to implement input and output functions of the mobile phone, in some embodiments, the touch panel 431 and the display panel 441 may be integrated to implement the input and output functions of the mobile phone.

The mobile phone may further include at least one sensor 450 such as an optical sensor, a motion sensor, and other sensors. Specifically, the optical sensor may include an ambient light sensor and a proximity sensor. The ambient light sensor may adjust luminance of the display panel 441 according to brightness of the ambient light. The proximity sensor may switch off the display panel 441 and/or backlight when the mobile phone is moved to the ear. As one type of motion sensor, an acceleration sensor can detect magnitude of accelerations in various directions (generally on three axes), may detect magnitude and a direction of the gravity when static, and may be applied to an application that recognizes the attitude of the mobile phone (for example, switching between landscape orientation and portrait orientation, a related game, and magnetometer attitude calibration), a function related to vibration recognition (such as a pedometer and a knock), and the like. Other sensors, such as a gyroscope, a barometer, a hygrometer, a thermometer, and an infrared sensor, which may be configured in the mobile phone, are not further described herein.

The audio circuit 460, a speaker 461, and a microphone 462 may provide audio interfaces between the user and the mobile phone. The audio circuit 460 may convert received audio data into an electrical signal and transmit the electrical signal to the speaker 461. The speaker 461 converts the electrical signal into a sound signal for output. On the other hand, the microphone 462 converts a collected sound signal into an electrical signal. The audio circuit 460 receives the electrical signal, converts the electrical signal into audio data, and outputs the audio data to the processor 480 for processing. Then, the processor 480 sends the audio data to, for example, another mobile phone by using the RF circuit 410, or outputs the audio data to the memory 420 for further processing.

Wi-Fi belongs to a short distance wireless transmission technology. The mobile phone may help, by using the Wi-Fi module 470, a user to receive and send an email, browse a web page, access stream media, and the like. This provides wireless broadband Internet access for the user. Although FIG. 11 shows the Wi-Fi module 470, it may be understood that the Wi-Fi module 470 is not a necessary component of the mobile phone, and the Wi-Fi module may be omitted as required provided that the scope of the essence of the application is not changed.

The processor 480 is a control center of the mobile phone, and is connected to various parts of the entire mobile phone by using various interfaces and lines. By running or executing a software program and/or module stored in the memory 420, and invoking data stored in the memory 420, the processor 480 executes various functions of the mobile phone and performs data processing, thereby monitoring the entire mobile phone. Optionally, the processor 480 may include one or more processing units. Optionally, the processor 480 may integrate an application processor and a modem processor. The application processor mainly processes an operating system, a user interface, an application program, and the like. The modem processor mainly processes wireless communication. It may be understood that the foregoing modem may either not be integrated into the processor 480.

The mobile phone further includes the power supply 490 (such as a battery) for supplying power to the components. Optionally, the power supply may be logically connected to the processor 480 by using a power management system, thereby implementing functions such as charging, discharging and power consumption management by using the power management system.

Although not shown in the figure, the mobile phone may further include a camera, a Bluetooth module, and the like, which are not further described herein.

In one embodiment of the present disclosure, the processor 480 included in the terminal further has the following functions: acquiring a first image of a target object; extracting coordinate information of a first 2D key point corresponding to the target object from the first image; acquiring a second image of the target object; acquiring coordinate information of a second 2D key point in the second image according to the coordinate information of the first 2D key point, the first 2D key point and the second 2D key point being the same key point in the target object; acquiring coordinate information of a 3D key point corresponding to the target object, the 3D key point being a key point obtained after triangulation processing; and determining camera posture information of the second image according to the coordinate information of the first 2D key point, the coordinate information of the second 2D key point, and the coordinate information of the 3D key point, the camera posture information being used for determining a position of the target object in the second image.

Optionally, the processor 480 is further configured to perform the following operations: determine whether a number of second 2D key points in the second image reaches a threshold; and when the number of the second 2D key points reaches the threshold, trigger the operation of acquiring coordinate information of a second 2D key point in the second image according to the coordinate information of the first 2D key point.

Optionally, the processor 480 is specifically configured to perform the following operations: determining the first 2D key point from the first image; determining the second 2D key point corresponding to the first 2D key point from the first image; and determining the coordinate information of the second 2D key point according to the coordinate information of the first 2D key point and displacement information, where the displacement information is a distance from the first 2D key point to the second 2D key point.

Optionally, the processor 480 is further configured to perform the following operations: when the number of the second 2D key points does not reach the threshold, acquiring n key points from the first image, to enable a sum of the number of the second 2D key points and a number of the n key points to reach the threshold, where n is a positive integer, the n key points are acquired from a target area corresponding to the first image, the first image includes a plurality of equally divided areas, and a number of the key points in the target area is less than a preset key point threshold; and acquiring coordinate information of the n key points and coordinate information of the second 2D key points in the second image according to the coordinate information of the first 2D key point and coordinate information of the n key points.

Optionally, the processor 480 is specifically configured to perform the following operations: determining the first 2D key point and the n key points from the first image; determining the second 2D key points corresponding to the first 2D key point and the n key points from the first image; and determining the coordinate information of the n key points and the coordinate information of the second 2D key points in the second image according to the coordinate information of the first 2D key point, the coordinate information of the n key points, and displacement information, where the displacement information includes a distance from the first 2D key point to the second 2D key point and distances from the n key points to the second 2D key points.

Optionally, the processor 480 is further configured to perform the following operations: performing triangulation processing on the coordinate information of the first 2D key point, the coordinate information of the second 2D key points, camera posture information of the first image, and the camera posture information of the second image, and obtaining a 3D key point to be selected and coordinate information of the 3D key point to be selected; determining an observation angle according to the 3D key point to be selected, where the observation angle is an angle between a connecting line between a center point in the first image and the 3D key point to be selected and a connecting line between a center point in the second image and the 3D key point to be selected; and when the observation angle is greater than a preset angle, determining the coordinate information of the 3D key point to be selected as coordinate information of a target 3D key point.

Optionally, the processor 480 is further configured to perform the following operations: generating a tracking record, where the tracking record is used for recording coordinate information of 2D key points in a plurality of images, the first image in the tracking record is the first image, the last image in the tracking record is the second image, and at least one image is included between the first image and the second image.

Optionally, the processor 480 is specifically configured to perform the following operations: acquiring coordinate information of a third 2D key point of the target object and coordinate information of a fourth 2D key point of the target object according to the tracking record, where the third 2D key point belongs to a third image, the fourth 2D key point belongs to a fourth image, and the third image and the fourth image are both located between the first image and the second image; performing triangulation processing on the coordinate information of the first 2D key point and the coordinate information of the third 2D key point, and obtaining coordinate information of a first 3D key point; performing triangulation processing on the coordinate information of the third 2D key point and the coordinate information of the fourth 2D key point, and obtaining coordinate information of a second 3D key point; determining a first observation angle according to the coordinate information of the first 3D key point, and determining a second observation angle according to the coordinate information of the second 3D key point, where the first observation angle is an angle between a connecting line between a center point in the first image and the first 3D key point and a connecting line between a center point in the third image and the first 3D key point, and the second observation angle is an angle between a connecting line between a center point in the second image and the second 3D key point and a connecting line between a center point in the third image and the second 3D key point; when the first observation angle is greater than the second observation angle, determining the coordinate information of the first 3D key point as the coordinate information of the 3D key point of the target object; and when the second observation angle is greater than the first observation angle, determining the coordinate information of the second 3D key point as the coordinate information of the 3D key point of the target object.

Optionally, the processor 480 is specifically configured to perform the following operations: acquiring a 3D-2D projection error according to the coordinate information of the 3D key point; acquiring a 2D-2D epipolar distance according to the coordinate information of the first 2D key point and the coordinate information of the second 2D key point; and calculating a target function according to the 3D-2D projection error and the 2D-2D epipolar distance, and finding the minimum of the target function, to obtain the camera posture information of the second image.

Optionally, the processor 480 is specifically configured to perform the following operations: calculating the 3D-2D projection error by using the following formula:

$$A = \sum_{i \in C_{3D2D}} \|u_i - \pi_x(p_i)\|_2^2, \quad (4)$$

where A denotes the 3D-2D projection error, $C_{3D2D}$ denotes a set of 3D key points projected on the second image, $u_i$ denotes the coordinate information of the second 2D key point, $\pi_x$ denotes a projection function for 3D-2D projection, the projection function and the camera posture information have an association relationship, and $p_i$ denotes the coordinate information of the 3D key point.

The acquiring a 2D-2D epipolar distance according to the coordinate information of the first 2D key point and the coordinate information of the second 2D key point includes: calculating the 2D-2D epipolar distance by using the following formula:

$$B = \lambda \sum_{i \in C_{2D2D}} \frac{(u_i' F_x u_i)^2}{(F_x u_i)_1^2 + (F_x u_i)_2^2 + (F_x u_i')_1^2 + (F_x u_i')_2^2}, \quad (5)$$

where B denotes the 2D-2D epipolar distance, $C_{2D2D}$ denotes a set of the second 2D key points and the first 2D key points, $\lambda$ denotes a preset equilibrium constant, the preset equilibrium constant is used for keeping a difference between 2D-2D epipolar distance and the 3D-2D projection error within a preset range, $u'_i$ denotes the coordinate information of the first 2D key point, $F_x$ denotes an elementary matrix between the second image and the first image, and the projection function and the camera posture information have an association relationship.

The calculating a target function according to the 3D-2D projection error and the 2D-2D epipolar distance may include: calculating the target function by using the following formula:

$$E(x) = \sum_{i \in C_{3D2D}} \|u_i - \pi_x(p_i)\|_2^2 + \lambda \sum_{i \in C_{2D2D}} \frac{(u_i' F_x u_i)^2}{(F_x u_i)_1^2 + (F_x u_i)_2^2 + (F_x u_i')_1^2 + (F_x u_i')_2^2}, \quad (6)$$

where E(x) denotes the target function, and x denotes the camera posture information of the second image.

All or some of the foregoing embodiments may be implemented by using software, hardware, firmware, or any combination thereof. When software is used for implementation, implementation may be entirely or partially performed in the form of a computer program product.

The computer program product includes one or more computer instructions. When the computer program instructions are loaded and executed on a computer, all or some of the processes or functions according to the embodiments of the present disclosure are produced. The computer may be a general-purpose computer, a dedicated computer, a computer network, or another programmable apparatus. The computer instructions may be stored in a computer-readable storage medium, or transmitted from one computer-readable storage medium to another computer-readable storage medium. For example, the computer instructions may be transmitted from one website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, including one or more usable media. The available medium may be a magnetic medium (for example, a floppy disk, a hard disk, or a tape), an optical medium (for example, a digital versatile disc (DVD)), or a semi-conductive medium (for example, a solid state disk (SSD)).

A person skilled in the art may clearly understand that, for simple and clear description, for specific work processes of the foregoing described system, apparatus, and unit, reference may be made to corresponding process in the foregoing method embodiments, and details are not described herein again.

In the embodiments provided in the present disclosure, it is to be understood that the disclosed system, apparatus, and method may be implemented in other manners. For example, the described apparatus embodiments are merely exemplary. For example, the unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units. That is, they may be located in one position, or may be distributed on a plurality of network units. A part of or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software function unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the related art, or all or some of the technical solutions may be implemented in a form of a software product. The computer software product is stored in a storage medium and includes several instructions for instructing a computer device (which may be a PC, a server, a network device, or the like) to perform all or some of the steps of the methods described in the embodiments of the present disclosure. The foregoing storage medium includes: any medium that can store program code, such as a USB flash drive, a removable hard disk, a read-only memory (ROM), a random access memory (RAM), a magnetic disk, or an optical disc.

The foregoing embodiments are merely provided for describing the technical solutions of the present disclosure, but not intended to limit the present disclosure. It is to be understood by a person of ordinary skill in the art that although the present disclosure has been described in detail with reference to the foregoing embodiments, modifications can be made to the technical solutions described in the foregoing embodiments, or equivalent replacements can be made to some technical features in the technical solutions, as long as such modifications or replacements do not cause the essence of corresponding technical solutions to depart from the spirit and scope of the present disclosure.

What is claimed is:

1. A method for an image capturing device, comprising:
acquiring a first image of a target object;
extracting coordinate information of a first two-dimensional (2D) key point corresponding to the target object from the first image;
acquiring a second image of the target object;
acquiring coordinate information of a second 2D key point in the second image according to the coordinate information of the first 2D key point, the first 2D key point and the second 2D key point being the same key point in the target object;
acquiring coordinate information of a three-dimensional (3D) key point corresponding to the target object, the 3D key point being a key point obtained after a triangulation operation;
determining camera posture information of the second image according to the coordinate information of the first 2D key point, the coordinate information of the second 2D key point, the coordinate information of the 3D key point, and a 3D-2D projection, the camera posture information being used for determining a position of the target object in the second image;
wherein determining the camera posture information of the second image comprises:
acquiring a 3D-2D projection error according to the coordinate information of the 3D key point;
acquiring a 2D-2D epipolar distance according to the coordinate information of the first 2D key point and the coordinate information of the second 2D key point; and
calculating a target function according to the 3D-2D projection error and the 2D-2D epipolar distance, and finding a minimum of the target function, to obtain the camera posture information of the second image.

2. The method according to claim 1, further comprising:
determining whether a number of target 2D key points in the second image reaches a threshold, the target 2D key points corresponding to the target object in the second image; and
in response to determining that the number of the target 2D key points reaches the threshold, acquiring the coordinate information of the second 2D key point in the second image according to the coordinate information of the first 2D key point.

3. The method according to claim 2, further comprising:
when the number of the target 2D key points does not reach the threshold, acquiring n first key points from the first image, to enable a sum of the number of the target 2D key points and a number of the n first key points to reach the threshold, wherein n is a positive integer, the n first key points are acquired from a target area corresponding to the first image, the first image comprises a plurality of equally divided areas, and a number of the key points in the target area is less than a preset key point threshold; and
acquiring coordinate information of second 2D key points corresponding to the second image according to the coordinate information of the first 2D key point and coordinate information of the n first key points, the second 2D key points including the second 2D key point and n second key points, and each of the n second key points having a corresponding key point in the n first key point that represents a same key point in the target object.

4. The method according to claim 3, wherein the acquiring coordinate information of the second 2D key points in the second image comprises:
determining the first 2D key point and the n key points from the first image;
determining the second 2D key points corresponding to the first 2D key point and the n first key points from the first image; and
determining the coordinate information of the second 2D key points corresponding to the second image according to the coordinate information of the first 2D key point, the coordinate information of the n first key points, and displacement information, wherein the displacement information comprises a distance from the first 2D key point to the second 2D key point.

5. The method according to claim 1, wherein the acquiring coordinate information of a second 2D key point in the second image according to the coordinate information of the first 2D key point comprises:
determining the first 2D key point from the first image;
determining the second 2D key point corresponding to the first 2D key point from the first image; and
determining the coordinate information of the second 2D key point according to the coordinate information of the first 2D key point and displacement information, wherein the displacement information is a distance from the first 2D key point to the second 2D key point.

6. The method according to claim 1, further comprising:
performing triangulation processing on the coordinate information of the first 2D key point, the coordinate information of the second 2D key points, camera posture information of the first image, and the camera posture information of the second image, and obtaining a 3D key point to be selected and coordinate information of the 3D key point to be selected; and
determining an observation angle according to the 3D key point to be selected, wherein the observation angle is an angle between a connecting line between a center point in the first image and the 3D key point to be selected and a connecting line between a center point in the second image and the 3D key point to be selected; and
when the observation angle is greater than a preset angle, determining the coordinate information of the 3D key point to be selected as coordinate information of a target 3D key point.

7. The method according to claim 1, wherein after the acquiring coordinate information of a second 2D key point in the second image according to the coordinate information of the first 2D key point, the method further comprises:
generating a tracking record, wherein the tracking record is used for recording coordinate information of 2D key points in a plurality of images, the first image in the tracking record is the first image, the last image in the tracking record is the second image, and at least one image is comprised between the first image and the second image.

8. The method according to claim 7, wherein the acquiring coordinate information of a 3D key point corresponding to the target object comprises:
acquiring coordinate information of a third 2D key point of the target object and coordinate information of a fourth 2D key point of the target object according to the tracking record, wherein the third 2D key point belongs to a third image, the fourth 2D key point belongs to a fourth image, and the third image and the fourth image are both located between the first image and the second image;

performing the triangulation operation on the coordinate information of the first 2D key point and the coordinate information of the third 2D key point, and obtaining coordinate information of a first 3D key point;

performing the triangulation operation on the coordinate information of the third 2D key point and the coordinate information of the fourth 2D key point, and obtaining coordinate information of a second 3D key point;

determining a first observation angle according to the coordinate information of the first 3D key point, and determining a second observation angle according to the coordinate information of the second 3D key point, wherein the first observation angle is an angle between a connecting line between a center point in the first image and the first 3D key point and a connecting line between a center point in the third image and the first 3D key point, and the second observation angle is an angle between a connecting line between a center point in the second image and the second 3D key point and a connecting line between a center point in the third image and the second 3D key point;

when the first observation angle is greater than the second observation angle, determining the coordinate information of the first 3D key point as the coordinate information of the 3D key point of the target object; and when the second observation angle is greater than the first observation angle, determining the coordinate information of the second 3D key point as the coordinate information of the 3D key point of the target object.

9. The method according to claim 1, wherein the acquiring a 3D-2D projection error according to the coordinate information of the 3D key point and the coordinate information of the second 2D key point comprises:

calculating the 3D-2D projection error according to a set of 3D key points projected on the second image, the coordinate information of the second 2D key point, a projection function for 3D-2D projection with regard to the coordinate information of the 3D key point, the projection function and the camera posture information have an association relationship;

the acquiring a 2D-2D epipolar distance according to the coordinate information of the first 2D key point and the coordinate information of the second 2D key point comprises:

calculating the 2D-2D epipolar distance according to a set of the second 2D key points and the first 2D key points, a preset equilibrium constant used for keeping a difference between 2D-2D epipolar distance and the 3D-2D projection error within a preset range, the coordinate information of the first 2D key point, an elementary matrix between the second image and the first image; and the calculating a target function according to the 3D-2D projection error and the 2D-2D epipolar distance comprises:

calculating the target function according to a sum of the 3D-2D epipolar distance and the 2D-2D epipolar distance.

10. The method according to claim 1, further comprising:
acquiring additional image information; and
generating an enhanced image for augmented reality (AR) display according to the second image, the camera posture information of the second image, and the additional image information.

11. The method according to claim 10, wherein:
the additional image information is an image of a photographed real scene; and
generating the enhanced image includes: combining and displaying the image of the photographed real scene, the second image, and a movable content corresponding to the second image.

12. An image capturing device, comprising:
at least one memory being configured to store a computer program;
at least one processor connected to the memory and being configured to execute the computer program in the at least one memory to perform:
acquiring a first image of a target object;
extracting coordinate information of a first two-dimensional (2D) key point corresponding to the target object from the first image;
acquiring a second image of the target object;
acquiring coordinate information of a second 2D key point in the second image according to the coordinate information of the first 2D key point, the first 2D key point and the second 2D key point being the same key point in the target object;
acquiring coordinate information of a three-dimensional (3D) key point corresponding to the target object, the 3D key point being a key point obtained after a triangulation operation;
determining camera posture information of the second image according to the coordinate information of the first 2D key point, the coordinate information of the second 2D key point, the coordinate information of the 3D key point, and a 3D-2D projection, the camera posture information being used for determining a position of the target object in the second image;
wherein determining the camera posture information of the second image comprises:
acquiring a 3D-2D projection error according to the coordinate information of the 3D key point;
acquiring a 2D-2D epipolar distance according to the coordinate information of the first 2D key point and the coordinate information of the second 2D key point; and
calculating a target function according to the 3D-2D projection error and the 2D-2D epipolar distance, and finding a minimum of the target function, to obtain the camera posture information of the second image.

13. The image capturing device according to claim 12, wherein the at least one processor is further configured to perform:
performing the triangulation operation on the coordinate information of the first 2D key point, the coordinate information of the second 2D key points, camera posture information of the first image, and the camera posture information of the second image, and obtaining a 3D key point to be selected and coordinate information of the 3D key point to be selected;
determining an observation angle according to the 3D key point to be selected, wherein the observation angle is an angle between a connecting line between a center point in the first image and the 3D key point to be selected and a connecting line between a center point in the second image and the 3D key point to be selected; and when the observation angle is greater than a preset angle, determining the coordinate information of the 3D key point to be selected as coordinate information of a target 3D key point.

14. The image capturing device according to claim 12, wherein the at least one processor is further configured to perform:

determining whether a number of target 2D key points in the second image reaches a threshold, the target 2D key points corresponding to the target object in the second image; and in response to determining that the number of the target 2D key points reaches the threshold, acquiring the coordinate information of the second 2D key point in the second image according to the coordinate information of the first 2D key point.

15. The image capturing device according to claim 14, wherein the at least one processor is further configured to perform:

when the number of the target 2D key points does not reach the threshold, acquiring n first key points from the first image, to enable a sum of the number of the target 2D key points and a number of the n first key points to reach the threshold, wherein n is a positive integer, the n first key points are acquired from a target area corresponding to the first image, the first image comprises a plurality of equally divided areas, and a number of the key points in the target area is less than a preset key point threshold; and acquiring coordinate information of second 2D key points corresponding to the second image according to the coordinate information of the first 2D key point and coordinate information of the n first key points, the second 2D key points including the second 2D key point and n second key points, and each of the n second key points having a corresponding key point in the n first key point that represents a same key point in the target object.

16. The image capturing device according to claim 15, wherein the acquiring coordinate information of the second 2D key points in the second image comprises:

determining the first 2D key point and the n key points from the first image;

determining the second 2D key points corresponding to the first 2D key point and the n first key points from the first image; and determining the coordinate information of the second 2D key points corresponding to the second image according to the coordinate information of the first 2D key point, the coordinate information of the n first key points, and displacement information, wherein the displacement information comprises a distance from the first 2D key point to the second 2D key point.

17. The image capturing device according to claim 12, wherein the acquiring coordinate information of a second 2D key point in the second image according to the coordinate information of the first 2D key point comprises:

determining the first 2D key point from the first image;

determining the second 2D key point corresponding to the first 2D key point from the first image; and determining the coordinate information of the second 2D key point according to the coordinate information of the first 2D key point and displacement information, wherein the displacement information is a distance from the first 2D key point to the second 2D key point.

18. A non-transitory computer-readable storage medium storing computer program instructions executable by at least one processor to perform:

acquiring a first image of a target object;

extracting coordinate information of a first two-dimensional (2D) key point corresponding to the target object from the first image;

acquiring a second image of the target object;

acquiring coordinate information of a second 2D key point in the second image according to the coordinate information of the first 2D key point, the first 2D key point and the second 2D key point being the same key point in the target object;

acquiring coordinate information of a three-dimensional (3D) key point corresponding to the target object, the 3D key point being a key point obtained after a triangulation operation;

determining camera posture information of the second image according to the coordinate information of the first 2D key point, the coordinate information of the second 2D key point, the coordinate information of the 3D key point, and a 3D-2D projection, the camera posture information being used for determining a position of the target object in the second image;

wherein determining the camera posture information of the second image comprises:

acquiring a 3D-2D projection error according to the coordinate information of the 3D key point;

acquiring a 2D-2D epipolar distance according to the coordinate information of the first 2D key point and the coordinate information of the second 2D key point; and calculating a target function according to the 3D-2D projection error and the 2D-2D epipolar distance, and finding a minimum of the target function, to obtain the camera posture information of the second image.

19. The non-transitory computer-readable storage medium according to claim 18, wherein the computer program instructions further cause the at least one processor to perform:

performing the triangulation operation on the coordinate information of the first 2D key point, the coordinate information of the second 2D key points, camera posture information of the first image, and the camera posture information of the second image, and obtaining a 3D key point to be selected and coordinate information of the 3D key point to be selected;

determining an observation angle according to the 3D key point to be selected, wherein the observation angle is an angle between a connecting line between a center point in the first image and the 3D key point to be selected and a connecting line between a center point in the second image and the 3D key point to be selected; and when the observation angle is greater than a preset angle, determining the coordinate information of the 3D key point to be selected as coordinate information of a target 3D key point.

20. The non-transitory computer-readable storage medium according to claim 18, wherein the computer program instructions further cause the at least one processor to perform:

acquiring additional image information; and generating an enhanced image for augmented reality (AR) display according to the second image, the camera posture information of the second image, and the additional image information.

\* \* \* \* \*